United States Patent
Ochandio et al.

(10) Patent No.: US 9,824,123 B2
(45) Date of Patent: Nov. 21, 2017

(54) SYSTEM AND METHOD FOR FINDING MATCHES BETWEEN USERS IN A NETWORKED ENVIRONMENT

(71) Applicant: MATCH.COM, L.L.C., Dallas, TX (US)

(72) Inventors: Ernesto Ochandio, Dallas, TX (US); Devaraj Sundaram, Dallas, TX (US); Monica Klawitter, Dallas, TX (US); Amarnath Thombre, Dallas, TX (US); Helen Fisher, New York, NY (US); Sydney Lam, Dallas, TX (US); Todd Carrico, Melissa, TX (US)

(73) Assignee: MATCH.COM, L.L.C., Dallas, TX (US)

(*) Notice: Subject to any disclaimer, the term of this patent is extended or adjusted under 35 U.S.C. 154(b) by 348 days.

(21) Appl. No.: 14/084,723

(22) Filed: Nov. 20, 2013

(65) Prior Publication Data
US 2015/0142839 A1    May 21, 2015

(51) Int. Cl.
*G06F 7/00* (2006.01)
*G06F 17/30* (2006.01)
*G06Q 50/00* (2012.01)

(52) U.S. Cl.
CPC ......... *G06F 17/3053* (2013.01); *G06Q 50/01* (2013.01)

(58) Field of Classification Search
CPC . G06F 17/3053; G06Q 30/0256; G06Q 50/01
See application file for complete search history.

(56) References Cited

U.S. PATENT DOCUMENTS

| | | | |
|---|---|---|---|
| 5,696,981 A * | 12/1997 | Shovers | G09B 7/02 434/236 |
| 6,272,467 B1 * | 8/2001 | Durand | G06Q 10/02 705/26.1 |
| 7,185,355 B1 | 2/2007 | Ellis et al. | |
| 7,342,503 B1 * | 3/2008 | Light | G06Q 30/02 340/539.1 |
| 7,454,357 B2 | 11/2008 | Buckwalter et al. | |
| 7,801,971 B1 * | 9/2010 | Amidon | G06Q 10/10 709/200 |
| 7,966,278 B1 | 6/2011 | Satish | |
| 8,332,418 B1 * | 12/2012 | Giordani | G06Q 50/01 707/706 |

(Continued)

OTHER PUBLICATIONS

U.S. Appl. No. 14/084,704, filed Nov. 20, 2013.
(Continued)

*Primary Examiner* — Hasanul Mobin
(74) *Attorney, Agent, or Firm* — Patent Capital Group

(57) ABSTRACT

Finding a match for an end user on an online social platform is not a trivial task. To improve match making, various methods and systems are disclosed which are configured to compute heuristics for various end users, which help to predict the likelihood that two end users would ultimately engage in some form of communication with each other. The heuristics are used in an algorithm (i.e., a statistical/predictive model) for providing a set of matches to an end user. These heuristics may be computed based on varying forms of communication which indicate different levels of engagement between end users, and/or based on some other indication of how an end user may react to another end user.

20 Claims, 17 Drawing Sheets

(56) References Cited

U.S. PATENT DOCUMENTS

| | | | |
|---|---|---|---|
| 8,458,153 B2 | 6/2013 | Pierce | |
| 8,478,757 B2 | 7/2013 | Leibu | |
| 8,566,142 B2 | 10/2013 | McCarney | |
| 8,782,038 B2 | 7/2014 | Mishra et al. | |
| 8,812,519 B1* | 8/2014 | Bent | G06Q 30/0269 705/319 |
| 8,886,645 B2 | 11/2014 | Jones | |
| 9,049,259 B2 | 6/2015 | Rathod | |
| 9,158,821 B1 | 10/2015 | Quisel et al. | |
| 9,245,301 B2 | 1/2016 | Klawitter et al. | |
| 9,251,220 B2 | 2/2016 | Klawitter et al. | |
| 9,253,138 B2 | 2/2016 | Bates | |
| 2002/0128885 A1 | 9/2002 | Evans | |
| 2003/0144862 A1 | 7/2003 | Smith et al. | |
| 2003/0191673 A1* | 10/2003 | Cohen | G06Q 10/02 705/5 |
| 2004/0128148 A1* | 7/2004 | Austin | G06Q 50/01 705/319 |
| 2004/0249811 A1* | 12/2004 | Shostack | G06Q 30/02 |
| 2005/0021750 A1* | 1/2005 | Abrams | G06Q 10/10 709/225 |
| 2005/0086211 A1* | 4/2005 | Mayer | H04L 51/04 |
| 2006/0106667 A1* | 5/2006 | Coyne | G06Q 30/02 |
| 2006/0173963 A1* | 8/2006 | Roseway | G06Q 10/107 709/206 |
| 2006/0216680 A1* | 9/2006 | Buckwalter | G09B 7/02 434/236 |
| 2007/0073802 A1* | 3/2007 | Terrill | G06Q 50/22 709/203 |
| 2008/0301557 A1* | 12/2008 | Kotlyar | G06Q 10/10 715/706 |
| 2009/0164464 A1* | 6/2009 | Carrico | G06F 17/30657 |
| 2009/0265326 A1* | 10/2009 | Lehrman | G06F 17/30867 |
| 2009/0265430 A1 | 10/2009 | Bechtel et al. | |
| 2009/0322597 A1 | 12/2009 | Medina-Herrero et al. | |
| 2010/0246576 A1 | 9/2010 | Bustamente | |
| 2010/0283827 A1 | 11/2010 | Bustamente | |
| 2010/0285856 A1 | 11/2010 | Thomas | |
| 2010/0287286 A1 | 11/2010 | Bustamente | |
| 2011/0145039 A1 | 6/2011 | McCarney | |
| 2011/0302583 A1 | 12/2011 | Abadi et al. | |
| 2011/0313647 A1 | 12/2011 | Koebler et al. | |
| 2012/0290979 A1* | 11/2012 | Devecka | H04W 4/206 715/810 |
| 2013/0212479 A1 | 8/2013 | Willis et al. | |
| 2013/0238708 A1 | 9/2013 | Bustamente | |
| 2014/0074602 A1* | 3/2014 | van Elsas | G06F 17/5009 705/14.53 |
| 2014/0129942 A1 | 5/2014 | Rathod | |
| 2014/0214711 A1 | 7/2014 | Filstein | |
| 2015/0100422 A1 | 4/2015 | Quisel et al. | |
| 2015/0100424 A1 | 4/2015 | Maxim et al. | |
| 2016/0134713 A1 | 5/2016 | Maxim et al. | |
| 2016/0155154 A1 | 6/2016 | Klawitter et al. | |

OTHER PUBLICATIONS

U.S. Appl. No. 14/084,718, filed Nov. 20, 2013.
Offringa, Peter "Zoosk—The Engineering behind Real Time Communications," available online at <URL http://highscaleability.com/blog/2012/8/27/zoosk-the-engineering-behind-real-time-communications.html>, Aug. 27, 2012 (4 pages).
Zoosk Customer Support, "How Do I Video Chat?" available online at <URL https://zoosk.zendesk.com/entries/20513017-how-do-i-video-chat> Oct. 7, 2011 (3 pages).
Notice of Allowance issued in U.S. Appl. No. 14/084,704 dated Oct. 13, 2015, 12 pages.
Notice of Allowance issued in U.S. Appl. No. 14/084,718 dated Oct. 7, 2015, 13 pages.
Non-Final Office Action in U.S. Appl. No. 13/722,129 dated Oct. 7, 2013.
Notice of Allowance in U.S. Appl. No. 13/722,129 dated Apr. 15, 20143.
Non-Final Office Action in U.S. Appl. No. 13/722,129 dated Oct. 29, 2014.
Final Office Action in U.S. Appl. No. 13/722,129 dated Feb. 3, 2015.
Non-Final Office Action dated Apr. 13, 2016 in U.S. Appl. No. 13/722,129, 14 pages.
U.S. Appl. No. 14/339,983, filed Jul. 24, 2014.
Non-Final Office Action for U.S. Appl. No. 14/339,983 dated Nov. 6, 2015, 15 pages.
Final Office Action in U.S. Appl. No. 14/339,983 dated May 19, 2016.
Final Office Action in U.S. Appl. No. 14/538,983 dated May 15, 2017.
Final Office Action in U.S. Appl. No. 13/722,129, dated Jul. 22, 2016.
Non-Final Office Action for U.S. Appl. No. 14/048,765 dated Nov. 9, 2015, 12 pages.
Final Office Action in U.S. Appl. No. 14/048,765 dated Jun. 3, 2016.
Non-Final Office Action in U.S. Appl. No. 14/538,983 dated Nov. 25, 2016.

* cited by examiner

FIG. 2C

FIG. 2D match.com® | My Match | Search | My Profile | Email | Advice:

Sign In ☐ Account Settings ☐ How Match Works ☐ Help ☐

Click here to subscribe to Match.com today!

Sign up to see her profile.

Ready to learn more about who LadyDi520 is and who she is looking for? Sign up for free below!

LadyDi520
32-year old
Dallas TX, US
Active within 24 hours

Choose a username: [          ]
Choose a password: [          ]
Your email address: [          ]
I am a:        ○ Man   ○ Woman
Seeking:       ○ Man   ○ Woman
Between ages:  [25 ▼] and [33 ▼]
Your birthday: [Month ▼] [Day ▼] [Year ▼]
Your country:  [United States ▼]
Zip / postal code: [          ]
Where did you hear about Match.com: [Choose below ▼] (Optional)

☑ Send me photos of my compatible matches. By checking this box, I also consent to receive from Match.com special offers and promotions relating to Match.com and select third parties, as well as tips and announcements on how I can better use the Match.com service.

☐ Send me special offers and partner promotions. Receive exclusive deals and timely updates sent to you by select Match.com partners.

I am at least 18 years old and have read and agree to Match.com's terms of use and privacy policy.

FIG. 2F match.com®  [SUBSCRIBE]   Home  Search ▾  Matches ▾  Connections ▾  Messages ▾  Profile ●  Account ▾

Welcome lisdfkidsasifhdk                                                    🖳 mobile  ✛ invite friends Find Love. Guaranteed. GO >>   No one can find you until you finish your profile. Complete yours now >>

ABOUT ME
ABOUT MY DATE
APPEARANCE <
BACKGROUND/VALUES
LIFESTYLE
IN MY OWN WORDS
- - - - -
PHOTOS

HER APPEARANCE

⚛ SYNAPSE INTELLIGENT MATCHING — Now tell us what you're looking for so we can start selecting compatible matches for you.

How tall should she be?
From [3 ▾] ft. [0 ▾] in. To [8 ▾] ft. [11 ▾] in.  ☑ No Preference

Body type:
☐ Slender
☐ Athletic and toned
☐ A few extra pounds
☐ Big and beautiful
☐ full-figured ☐ About average
☐ Heavyset
☐ Stocky
☐ Curvy

Eye Color:
☐ Black   ☐ Blue   ☑ No Preference
☐ Grey    ☐ Green  ☐ Brown
                   ☐ Hazel

Hair Color:
☐ Auburn / Red   ☐ Black         ☑ No Preference
☐ Light brown    ☐ Dark Brown
☐ Blonde         ☐ Salt and pepper
☐ Silver         ☐ Dark blonde
☐ Grey           ☐ Platinum
☐ Bald

UPLOAD PHOTOS   76%

[ SAVE & CONTINUE >> ]

FIG. 2G match.com®    [SUBSCRIBE]    Home   Search ▾   Matches ▾   Connections ▾   Messages ▾   Profile ●   Account ▾

Welcome lisdfkidsasifhdk      📱 mobile   ✚ invite friends

Find Love. Guaranteed. GO >>      No one can find you until you finish your profile. Complete yours now >>

- ABOUT ME
- ABOUT MY DATE
- APPEARANCE
- BACKGROUND/VALUES >
- LIFESTYLE
- IN MY OWN WORDS
- ------
- PHOTOS

HER BACKGROUND/VALUES    76%    Be honest about your deal breakers, and careful not to be too limiting.

(S) SYNAPSE INTELLIGENT MATCHING

Ethnicities:
- ☑ No Preference
- ☐ Asian
- ☐ Black / African descent
- ☐ East Indian
- ☐ Latino / Hispanic
- ☐ Middle Eastern
- ☐ Native American
- ☐ Pacific Islander
- ☐ White / Caucasian
- ☐ Other

Religion:
- ☑ No Preference
- ☐ Agnostic
- ☐ Atheist
- ☐ Buddhist / Taoist
- ☐ Christian / Catholic
- ☐ Christian / LDS
- ☐ Christian / Protestant
- ☐ Hindu
- ☐ Jewish
- ☐ Muslim / Islam
- ☐ Spiritual but not religious
- ☐ Other
- ☐ Christian / Other

Education level:
- ☑ No Preference
- ☐ High School
- ☐ Some College
- ☐ Associates degree
- ☐ Bachelors degree
- ☐ Graduate degree
- ☐ PhD / Post Doctoral

Languages spoken:
- ☐ No Preference
- ☑ English
- ☐ French
- ☐ Spanish more >>

UPLOAD PHOTOS

[SAVE & CONTINUE >>]

FIG. 2H match.com©

LadyDi520
Active within 24 hours    New

Basics
"Looking for my Knight is Shining Armor"

| | |
|---|---|
| I am a: | 32 yr old woman |
| located in: | Dallas, Texas, United States |
| looking for: | Dating: 32 to 45-year old man within 25 miles of Dallas metroplex, Dallas, Texas, United States |
| relationships: | Currently separated |
| my ethnicity: | White / Caucasian |
| body type: | Slender |
| height: | 5' 4" (162.6 cms) |
| sense of humor: | Clever: Nothing's better than a quick-witted comeback, Friendly: I'll laugh at anything |
| sign: | Cancer |

210    204  close window

[ FAVORITE ☆ ]    [ MESSAGE HER! ]

206 — [ WINK AT HER ☺ ]

208 — [ MAYBE... ]

About me and who I'd like to meet
I am a good person that is very caring, I have been married for almost 6 years and we are getting divorced. (I wanted it so don't say sorry LOL) I am just looking for someone that can make me smile, laugh, and enjoy life again it is too short to stay in something that has nothing left. I hope my knight in shining armor is out there somewhere!!!!!

Appearance

| | |
|---|---|
| height: | 5' 4" (162.6 cms) |
| eyes: | Green |
| hair: | Auburn / Red |
| body type: | Slender |
| body art: | Belly button ring |
| best feature: | Chest |

Interests
for fun:
I love to have a good time at whatever I am doing. I love to laugh I love to smile and I am looking for that someone that can make that happen, it hasn't for a LONG time.

FROM FIG. 2H favorite hot spots:
I love Olive Garden (cheap date) LOL then karokee, pool, things like that I am more into smaller bars then the big ones favorite things:
I love shows like CSI, Las Vegas, Court TV, I love to read true crime novels and SPORTS Ohio State Football is #1 then Nascar I love JR and Stewart last read:
A book by Ann Rule

| | |
|---|---|
| sense of humor: | Clever: Nothing's better than a quick-witted comeback, Friendly: I'll laugh at anything |
| sports and exercise: | No Answer |
| common interests: | Cooking, Dining out, Movies/Videos, Music and concerts, Watching sports |

Lifestyle

| | |
|---|---|
| exercise habits: | Don't exercise |
| daily diet: | Meat and potatoes |
| smoke: | Daily |
| drink: | Social drinker, maybe one or two |
| job: | Other profession |

I am a bartender right now, I use to be a medical secretary but got tired of the 9-5 taking a break

| | |
|---|---|
| income: | $25,001 to $35,000 |
| my place: | Live with pets |
| have kids: | Yes, and they live away from home |
| how many: | 3 |
| want kids: | No Answer |
| pets: | |
| I have: | Dogs, Fish |
| I don't have, but like: | Cats |
| I don't like: | Reptiles, Birds, Exotic pets, Gerbils / Guinea Pigs / Etc., Fleas, Other |

Background / Values

| | |
|---|---|
| ethnicity: | White / Caucasian |
| faith: | Christian / Other |
| education: | Some college |

Ohio State for 2 years

FROM FIG. 2I

| | |
|---|---|
| languages: | English |
| politics: | Conservative |
| About My Date | |
| hair: | Light brown, Dark brown, Blonde, Bald |
| eyes: | Blue, Green |
| height: | 5' 8" (172.7 cms) to 6' 8" (203.2 cms) |
| body type: | About average, Athletic and toned |
| languages: | English |
| ethnicity: | White / Caucasian |
| faith: | Christian / Other |
| education: | Any |
| job: | Political / Govt / Civil Service / Military |
| income: | Any |
| smoke: | Any |
| drink: | Social drinker, maybe one or two, regularly |
| relationships: | Committed relationships but never married, Widowed, Currently separated, Divorced, Several committed relationships - but now single |
| have kids: | Any |
| want kids: | Don't want to have kids |
| turn-ons: | Skinny dipping, Flirting, Thrills, Public displays of affection, Dancing, Power, Boldness / Assertiveness, Erotica, Candlelight |
| turn-offs: | Body piercings, Long hair, Sarcasm, Brainiacs, Thunderstorms |
| perfect date: | |
| | Fun |
| | Boot scootin' across gritty floorboards, the band playing what we'll soon remember as "our song" |
| Photos | |

SYSTEM AND METHOD FOR FINDING MATCHES BETWEEN USERS IN A NETWORKED ENVIRONMENT

TECHNICAL FIELD

This disclosure relates in general to the field of communications and, more particularly, to a system and a method for finding matches between end users of an online social platform.

BACKGROUND

Communications network architectures have experienced significant notoriety because they can offer the benefits of automation, convenience, and data management for their respective online communities. Certain network protocols may be used in order to allow an end user to be matched to other end users or to scenarios in which they stand to benefit (e.g., job searches, person-finding services, real estate searches, online dating, etc.).

In the case of an online dating service, for example, an end user will typically be prompted to specify a variety of preferences to be used in matching the end user with other end users in a particular online dating community. The information each end user provides about him or herself may be viewed by other end users in the online community in determining whether to interact with that end user. Even though end users now have the opportunities to be matched with many other end users on the platform, it remains a difficult challenge to suggest matches which ultimately results in two end users sharing mutual communication with each other.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-J are simplified screen shots of an example protocol for participating in an online social platform in accordance with some embodiments of the present disclosure;

DETAILED DESCRIPTION OF EXAMPLE EMBODIMENTS

Overview

Finding a match for an end user on an online social platform is not a trivial task. To improve match making, various methods and systems are disclosed which are configured to compute probability(-ies), and/or score value(s) based on various heuristics to predict the likelihood that two end users would ultimately engage in some form of communication with each other. The heuristics are used in an algorithm or a set of statistical models for providing a set of matches to an end user. These heuristics are based on varying forms of communication which indicate different levels of engagement between end users, and/or based on some other indication of how an end user may react to other end users.

Example Embodiments

Figure 1:
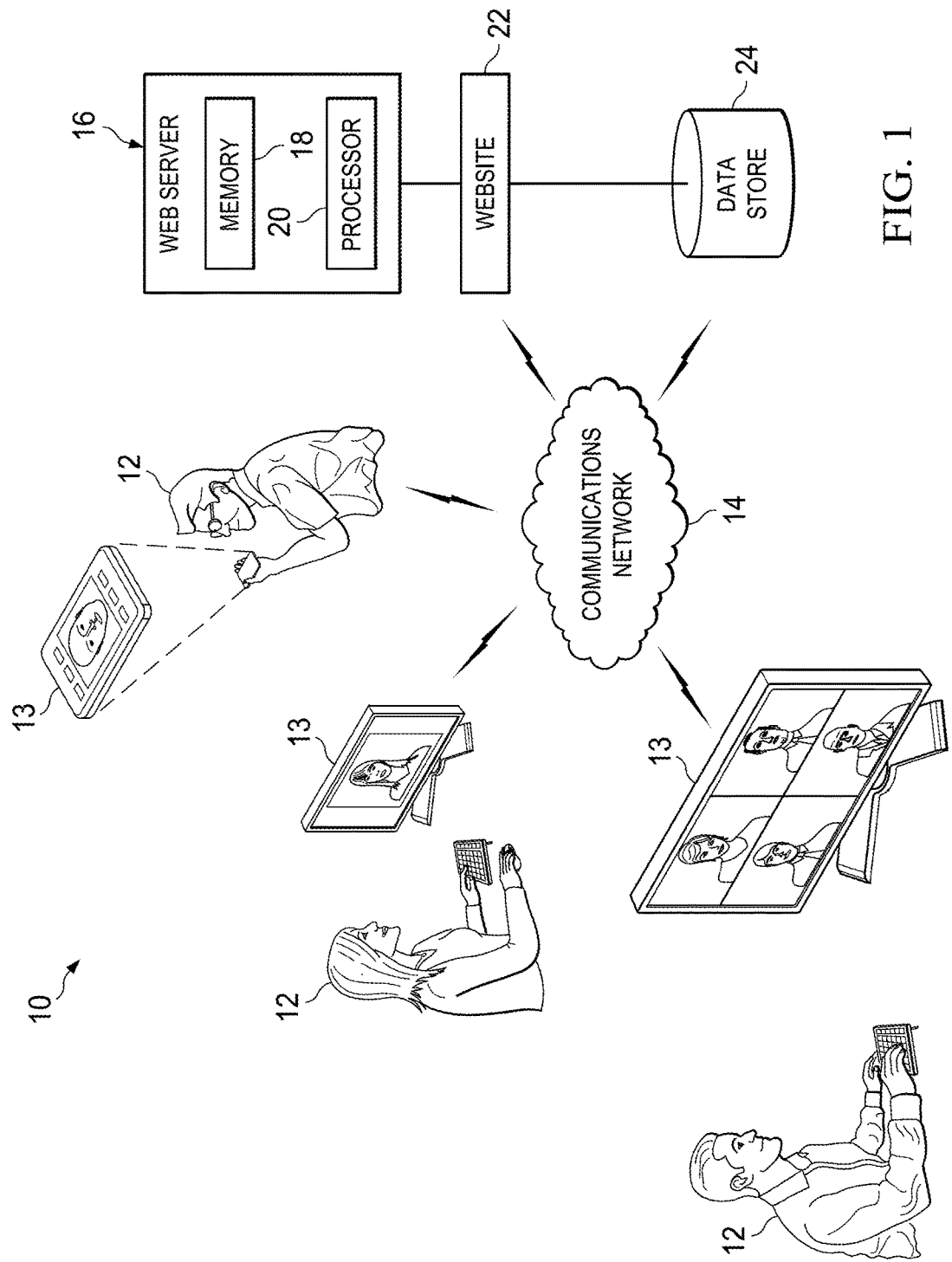
FIG. 1 is a network diagram showing an operating environment of the present disclosure in accordance with some embodiments of the present disclosure.

FIG. 1 is a network diagram showing an operating environment of the present disclosure, in accordance with one embodiment of the present disclosure. To illustrate the operating environment, FIG. 1 shows a simplified block diagram of an exemplary system 10 for providing an online dating service in a network environment. Although the present disclosure is described in the context of an online dating service, the disclosure is applicable to other but similar online social platforms, communities or networks utilizing the operating environment to provide a platform for end users to communicate with each other. For instance, in other embodiments where communications or matching between end users is valuable, system 10 can be leveraged to identify and to evaluate suitable candidates in other contexts, e.g., hiring/employment, recruiting, real estate, general person searches, etc.

FIG. 1 includes multiple end users 12 and endpoints 13, a communications network 14, a (web) server 16 comprising memory 18 and at least one processor 20, a website 22 (or in some embodiments, an application), and a data store 24. Through the communications network and the website, end users can participate in various forms of communications with other end users. Memory 18 and data store 24 may include any type of mechanism for storing data, including but not limited to one or more files, databases, memory devices, mass storage devices, data centers, etc. In some embodiments, the memory and/or data store may be used for storing one or more logs of the different forms of communications occurring between end users on the online social platform. Occurrences of and identities of end users participating in various forms of communication through the online social platform are thus tracked/monitored by the system. Using system 10, users 12 interact with web server 16 via endpoints 13, each of which comprises an appropriate user interface for interacting with web server 16 via website 22 for facilitating functions and features described herein. Generally, web server 16 is configured to provide output for the end user to consume at the end point. In certain example implementations, website 22 and web server 16 are consolidated into a single component, physical structure, equipment, etc.

FIG. 1 may be configured such that inter- and intra-communications are readily achieved by any of the components included therein. The present disclosure is capable of providing both an online component (as illustrated in FIG. 1) and an off-line component such that one or more end users can meet, gather information, resolve to meet, and then subsequently meet in person with the assistance of system 10. Both components may be logged in memory 18 and/or data store 24.

End users 12 may include a variety of types of end users, such as clients, customers, prospective customers, customer care agents, or entities wishing to participate in an online dating service and/or to view information associated with other participants in the system. End users 12 may also seek to access or to initiate communications with other end users that may be delivered via communications network 14. End users 12 may review data (such as user profiles, for example) associated with other users in order to make matching decisions or selections. Data (or sometimes referred to as "information") as used herein in this document, refers to any type of numeric, voice, video, or script data, or any other suitable information in any appropriate format that may be communicated from one point to another. User profile data may be stored in memory 18 and/or data store 24.

End users 12 may access the aforementioned data via endpoints 13, which may be inclusive of devices used perform various user activities, e.g., logging in, viewing a profile, initiating a communication, receiving communications/information from the server through an email/phone/messaging application, etc. Note that the broad term "user" or "end user" encompasses any type of node or user device, or any type of endpoint discussed herein. Additionally, the term "user" or "end user" can further include any type of profile to be used in the system discussed herein. Hence, the term "user" or "end user" can include (but is not limited to) elements such as a computer, a personal digital assistant (PDA), a laptop or electronic notebook, a cellular telephone, an IP telephone, an iPhone™, an iPad™, a Microsoft Surfacer™, an Android™ phone, a Google Nexus™, or any other device, component, element, or object capable of initiating voice, audio, or data exchanges within communication system 10. The endpoints may be inclusive of a suitable interface to the end user 12, such as a microphone, a display, or a keyboard or other terminal equipment. Endpoints 13 may also include any device that seeks to initiate a communication on behalf of another entity or element, such as a program, a database, or any other component, device, element, or object capable of initiating a voice or a data exchange within communication system 10. In addition, each of the endpoints 13 may be a unique element designed specifically for communications involving system 10. Such an element may be fabricated or produced specifically for matching applications involving end user 12 and endpoint 13.

An end user may employ any device capable of operating as an endpoint 13 to connect to communications network 14 via wire, wireless, cellular, satellite link or other suitable interfaces. Web server 16, which as previously noted includes memory 18 and at least one processor 20, hosts website 22. Web server 16 has access to transmit and receive user or presence data (e.g., user profile data, user and/or user endpoint data, user contact data, etc.) from database 24. Presence data may be collected, aggregated, and utilized as required to facilitate communications between endpoints 12 over communications network 10 or other outside communication systems. Presence data may also include information and/or instructions enabling the creation, duration, and termination of electronic communication sessions between diverse endpoints 13 that utilize different communication and/or networking protocols.

Communications network 14 is an electronics communications platform operable to exchange data or information emanating from endpoints 13. Communications network 14 represents an Internet architecture in a particular embodiment of the present disclosure, which provides end users 12 with the ability to electronically execute or to initiate user actions associated with finding a potential match candidate. Alternatively, communications network 14 could be a plain old telephone system (POTS), which end user 12 could use to perform the same operations or functions. In some embodiments, communications network may be a mobile phone (cellular) network, which end user 12 could use to perform the same operations or functions via, e.g., Short Message Service (SMS) messages, Multimedia Messaging Service (MMS) messages, etc. Such transactions may be assisted by management associated with website 22 and/or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

In one embodiment, web server 16 comprises a computer server that is operable to receive and to communicate information to one or more end users 12. In a generic sense, (web) server 16 can implement a computer-implemented matching system that provides a framework/platform for suitable matching activities. Alternatively, web server 16 may be any switch, router, gateway, cache, server blade, software, processor, proprietary component, object, module, or element (or any combination of these) operable to facilitate communications involving end user 12. Web server 16 may be integrated with database 24 and/or website 22, where any one or more of these elements may share or otherwise coordinate the activities discussed herein.

In one particular embodiment, web server 16, via interaction with database 24 and/or in conjunction with website 22, is engaged in facilitating interaction(s) between parties interested in seeking a romantic partner (i.e., in an online dating scenario). For example, website 22 can be online dating service provider www.Match.com, www.Chemistry.com, or any other suitable provider. In certain example scenarios, a given end user may pay a fee for a subscription-based service. Additionally, certain end user fee structures may apply to different tiers of service: some of which may entitle an end user to enhanced features on website 22 (e.g., the ability to communicate more frequently with other users, additional matches being provided (potentially, more frequently) to an end user who paid the higher fee structure, the ability to store data, the ability to share data, the ability to upload additional information, the ability to target specific searches based on particular criteria, the ability to receive preferential positioning in the context of being matched to other users, the ability to perform video calls (e.g., Skype, etc.) with other users, the ability to perform audio calls with other users, etc.).

In certain embodiments, website 22 (or one or more applications) is a computer-implemented matching system, which may be any website or architecture provided for facilitating a connection involving two or more people, and which may make use of a given profile, photograph, resume, article description, etc. This could include services associated with job placements, escort services, auction services, social media, real estate listings, recruiting services (e.g., in athletics, academia, employment scenarios, instances involving the sales of goods and services), etc.

Considerable flexibility is provided by the structure of web server 16 and website 22 in the context of system 10. Thus, it can be easily appreciated that such functions could be provided external to web server 16 or website 22. In such cases, such a functionality could be readily embodied in a separate component, application, server, processor, device, or module. Note that these online dating features and capabilities may be provided in just one of these elements, in both, or distributed across both of them. Hence, in certain embodiments, the online dating operations may be consolidated in a single website, where no redirection is needed, nor performed for the user.

In operation of an example embodiment, consider a case where a given end user is interested in participating in an online dating scenario. End user 12 can access website 22 via the communications network 14 (which in the example presented comprises the Internet) using endpoint 13, register, and create a profile on the site. Moreover, end user 12 can access website 22 through any suitable banner, pop-up, partnership, e-mail solicitations, messaging text reminders, direct mailings, etc. It can be appreciated that online commerce can be generated by a plethora of marketing tools and any such tools can readily cooperate with the operations of the present disclosure. At this point, matching of any form can commence amongst the members of the online community. For example, in the context of a romantic endeavor, a person may begin the dating process or engage in electronic communications that would spawn such dating. Other matching systems could include an online social platform for professionals and/or job applicants who are being sought by employers. Any of the individuals who are part of the online community made available through the online social platform can begin using any of the tools or capabilities of the platform.

Within the context of this disclosure, electronic communications through the online social platform may include two-way (or multi-way) electronic communications between a plurality of end users, one-way electronic communications from one end user to another end user, or indications of interest from one end user in another end user through the use of various features provided on the online social platform.

FIGS. 2A-2J illustrate example screen shots that may be provided in the online dating process to facilitate presentation of information to and gathering of information from (member) end users to form a user profile. FIGS. 2A-2J also illustrates exemplary user activity of an end user on the website. FIGS. 2A-2J are presented herein for purposes of discussion. It is imperative to note that these illustrations are only being provided to further outline a particular implementation of the present disclosure. In no way should these diagrams be used to limit or to restrict the broad teachings of the present disclosure. Such illustrative information has been offered earnestly and, thus, should not be construed to confine the broad applications of the present disclosure.

Figure 2A:
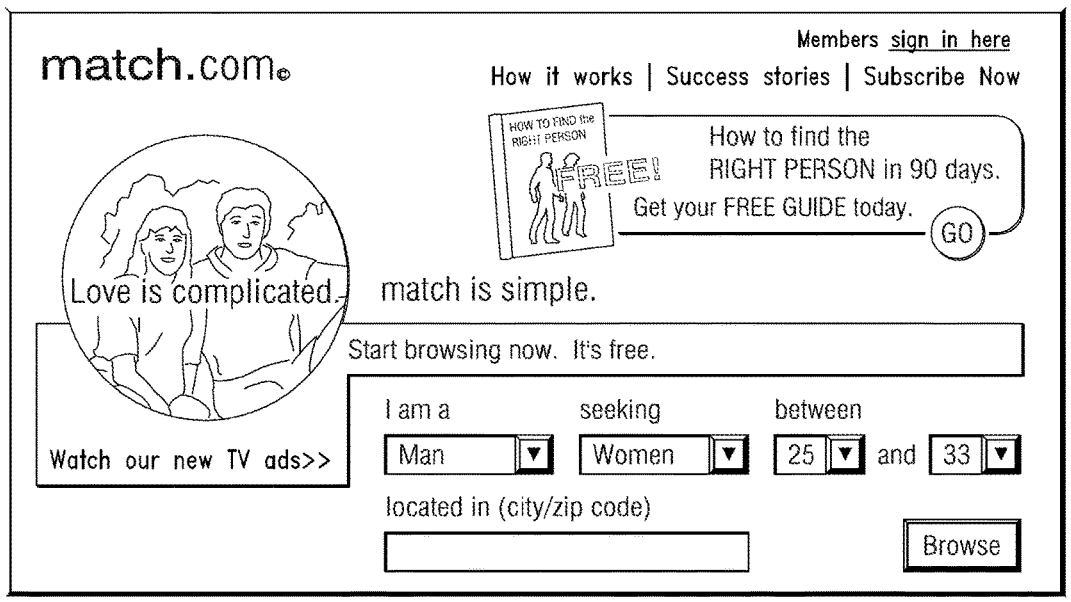
Figure 2B:
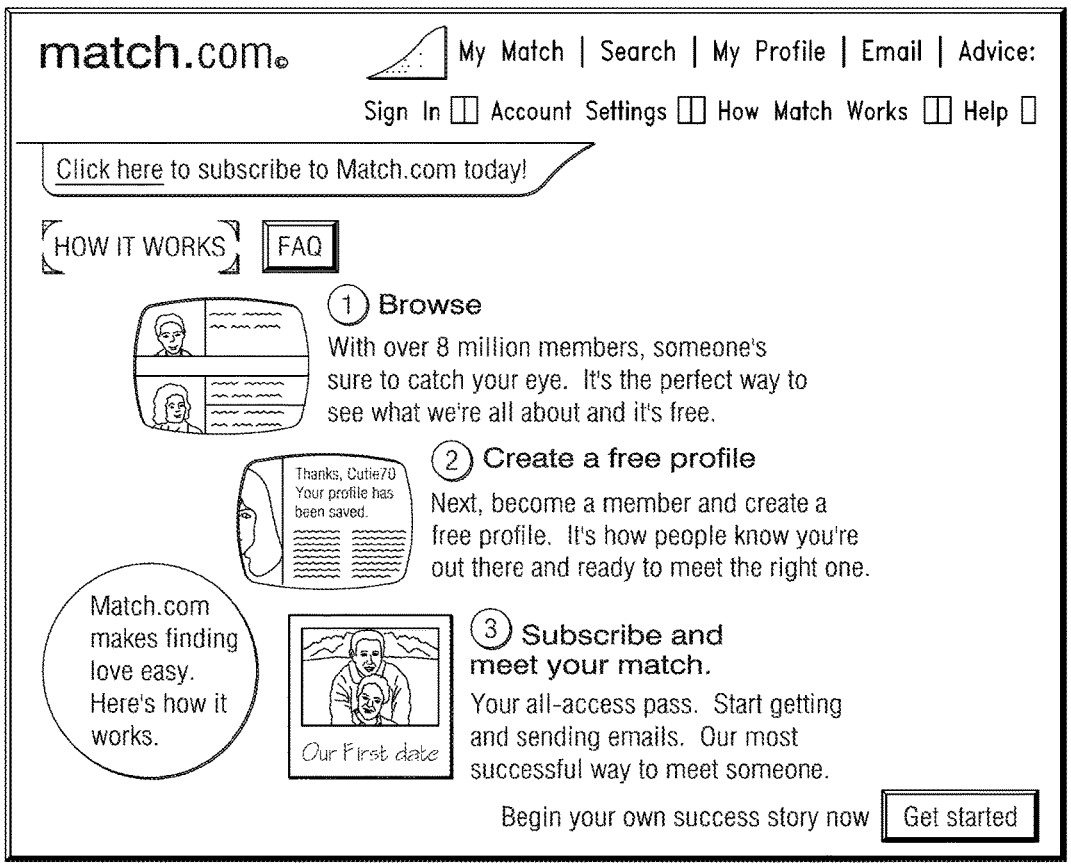

FIG. 2A is an example screen shot of a web page from which an interested end user may begin his/her journey. In the illustrated example, the web page solicits location information, such as a city or zip code, as well as an indication of the end user's gender and an age range and gender preference of persons the end user is interested in "meeting" via system 10. Subsequent to the end user's completion of the requested information and clicking on a "How it Works" icon on the web page of FIG. 2A, a screen shot as shown in FIG. 2B is presented to the end user. The screen shot of FIG. 2B provides a generic outline of the online dating process. As outlined in the screen shot of FIG. 2B, as a first step, an end user may choose to browse the website to view profile photos of members along with summaries of the members' profiles. After browsing the website, the end user may decide to create a free user profile. Once the end user browses the website and creates a user profile, the end user may opt to subscribe to the service and receive information from/about other end users who are part of the online social platform. For purposes of example and ease of explanation, it will be assumed for the remainder of the discussion of FIGS. 2A-2D that the potential new end user investigating and ultimately subscribing to the service is a male end user named "Tom" who is interested in finding a female match.

Figure 2C:
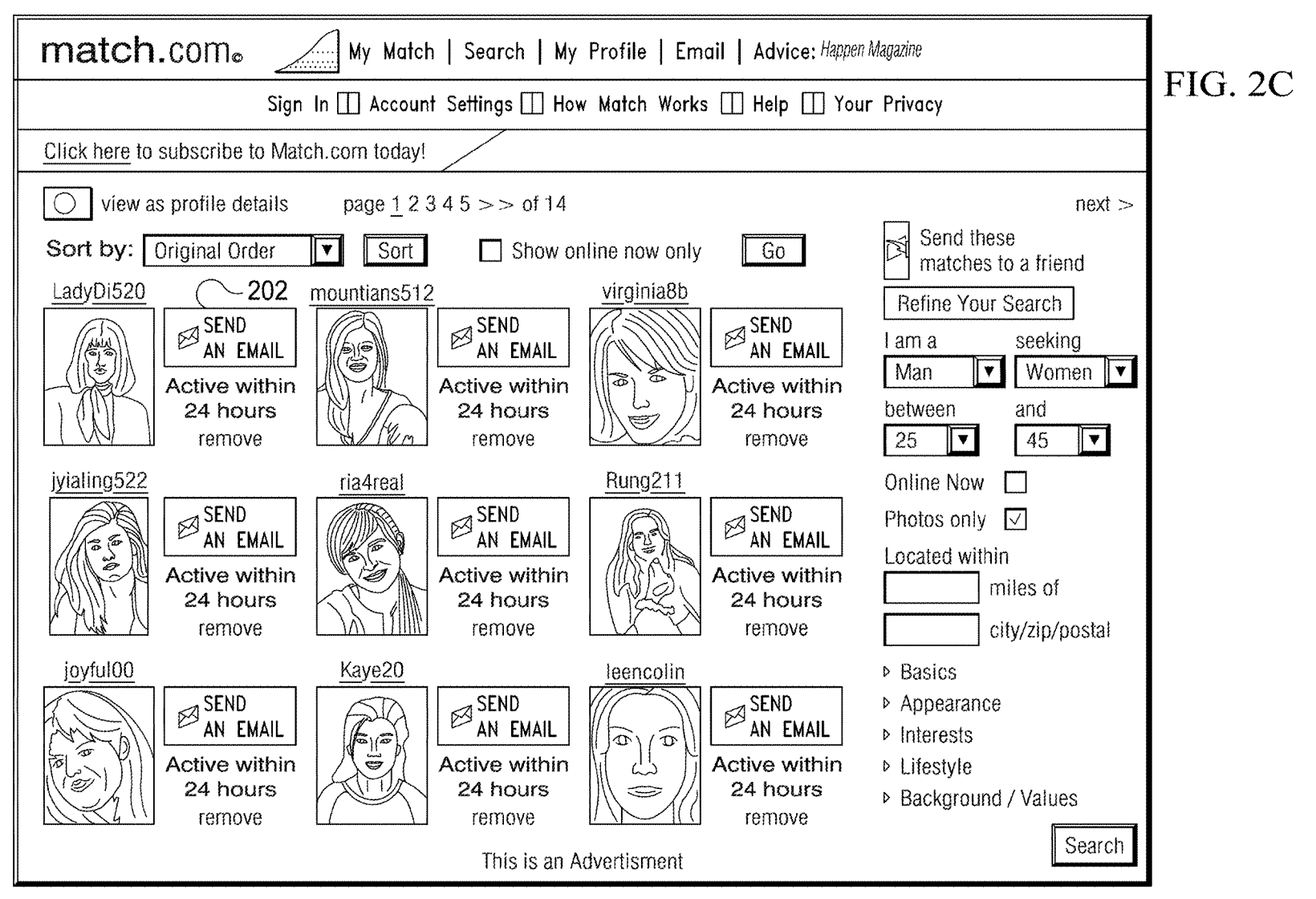

FIG. 2C is an example screen shot of a number of user profiles (in this case, profile photos, user names, last-active information) that may be viewed by Tom during the browsing phase described above. In the context of this screen shot, Tom may be simply browsing. Assuming Tom has decided he would like to know more about one of the members whose user profile is presented in FIG. 2C, he may click on the profile photo associated with the selected user profile. For example, assuming Tom has decided he would like more information about user with user name "LadyDi520", clicking on her picture results in his being directed to a web page as shown in FIG. 2D, where he is solicited to sign up for the online dating subscription such that he can effectively contact his candidate selection. It will be noted that the information solicited for a user profile using the page shown in FIG. 2C may be used in selecting matches for Tom. The information may also be displayed on Tom's profile page or summary thereof presented to other users to assist those users in determining whether they are interested in interacting with him. In the screen shown in FIG. 2C, Tom may also click on the link/button 202 to initiate an electronic message/mail conversation with "LadyDi520".

Figure 2E:
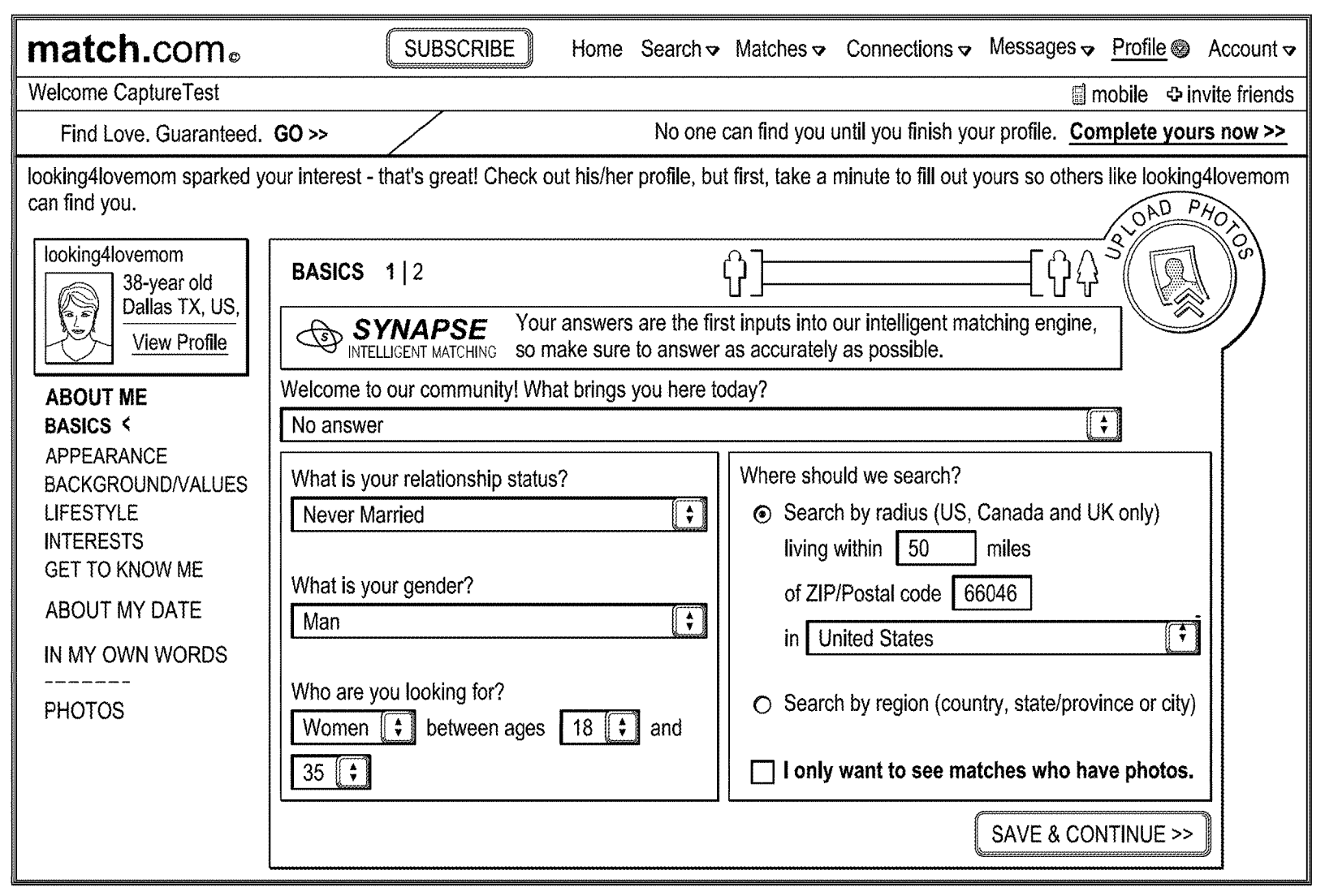

FIGS. 2E-2G illustrate various screen shots comprising a user information collection process, i.e., for collecting information for populating a user profile in accordance with one embodiment. Using the web pages illustrated in FIGS. 2E-2G, system 10 collects a variety of information/user profile attributes from an end user, including, but not limited to, basic information about the end user (FIG. 2E), search criteria for matches (FIG. 2E), as well as information about the type person the end user would be interested in dating, including information about a potential date's physical appearance (FIG. 2F) and background and values (FIG. 2G). System 10 may also ask the user to upload one or more photos for the user profile. It will be recognized that the information collected using the web pages illustrated in FIGS. 2E-2G is illustrative only and that any type/amount of information for a user profile may be solicited in the illustrated manner.

FIGS. 2H-2J are example screen shots of the full user profile of LadyDi520, the end user corresponding to the picture Tom selected while browsing. In the illustrated user profile, LadyDi520's match criteria are displayed, as well as other information that may be pertinent to a potential mate. Any suitable items can be provided in such a profile (such as interests, favorite hot spots, favorite things, desire for children, background, etc.). Virtually any type or format of information (inclusive of video and audio data) may be provided in such a profile. In particular, the profile includes information that was solicited from LadyDi520 when she set up her online dating account. A user profile may have a plurality of attributes. Attributes may include one or more photos, biographical information (e.g., gender, age, location, relationship status, etc.), physical information (e.g., height, weight, hair and eye color, etc.), interests (e.g., hobbies, "favorites," etc.), lifestyle information (e.g., exercise habits, employment, smoking/drinking habits, etc.), and/or background/values (e.g., ethnicity, faith, education, etc.). The profile may also include a section entitled "About My Date," in which the end user specifies preferences about the type of person he/she would like to meet/date (e.g., appearance, interests, faith, education, relationship goals, etc.). In some embodiments, a full profile, including the profile information provided by the end user and stored in the system, is displayed to interested viewers; in other embodiments, only a summary or subset of the profile information is displayed.

A Statistical Model Using a System of Heuristics Based on Different Forms of Electronic Communications Through the online social platform as described above, various end users can participate in different forms of electronic communication. This (past) behavior of end users can serve as heuristics—indications of how similar users are—to build groups of end users with similar desires and interests. From a group of similar users, predictions can be made whether a given end user would make a good match with another end user, e.g., based on this past behavior among the users. These predictions advantageously provide better chemistry among end users on the online social platform.

Different forms of electronic communication are not created equal. The different forms of electronic communication, depending on the nature of the communication, may indicate or suggest different levels of engagement/involvement/interest between end users. Rather than relying on just a single form of communication (or treating all forms of communication equally) to predict matches for end users, it has been discovered that a better predictive model can be provided using a system of heuristics. A statistical/predictive model using the system of heuristics allows the different forms of electronic communication to be treated differently when generating suitable matches for end users. For example, the heuristics can be provided with different weights and/or at different parts of the predictive model. Furthermore, other heuristics that are not based on past behavior can be used in conjunction with the heuristics based on past behavior in the predictive model. The predictive model using the system of heuristics provides a rich algorithm that is sophisticated and more accurate. An algorithm for finding one or more matching end users using this system of heuristics can better infer which end user would be more likely to engage in some form of electronic communication with the end user to be matched. To illustrate this basic idea, the various forms of electronic communication in which users can participate and other heuristics leveraged by the system of heuristics (and how they are different from each other) are described using exemplary screen shots shown in FIGS. 2H and 3-5. Together, the predictive model using one or more heuristics provides an improved predictor for finding matches for end users.

In one instance, a form of electronic communication includes two-way electronic communication back and forth between two end users. Another form of electronic communication includes one-way electronic communication. Generally speaking, two-way electronic communication would indicate a level of engagement between two end users that is higher than the level if engagement suggested by a one-way electronic communication from one end user to another (but no response from the other end user). Two-way electronic communication indicates mutual interest between two end users. Such mutual interest is considered stronger than the level of interest indicated by one-way electronic communication, when a statistical model (or a set of statistical models) aims to predict (the chances of) whether a potential matching end user would participate in two-way electronic communication with the end user to be matched.

In another instance, a form of electronic communication includes transmitting/receiving an electronic message/mail. Another form of electronic communication includes transmitting/receiving an indication of interest (e.g., a virtual act of communication on the online social platform). Generally speaking, the transmission of an electronic message may indicate a higher level of engagement or involvement than an indication of interest (e.g., a virtual flirtatious action) transmitted through the online social platform. The transmission of an electronic message indicates a substantial interest of an end user to communicate with another user though a message or mail composed by that end user. In contrast, an indication of interest lacks the message or mail that is personally composed by that end user. Therefore, transmitting an electronic message from one end user to another end user is a form of electronic communication which indicates a higher level of engagement than transmitting an indication of interest.

Heuristics Based on Electronic Messaging

For instance, the end user Tom, upon viewing the user profile of LadyDi520, may initiate an electronic mail/message communication with LadyDi520 by clicking on the link/button 204 ("MESSAGE HER!") in FIG. 2H to carry out a one-way electronic message/mail communication. The end user Tom may then be provided with a user interface to compose an electronic mail/message to be transmitted to LadyDi520. LadyDi520 may transmit an electronic mail/message in response to Tom's message, thereby completing a two-way electronic message/mail communication.

Figure 3:
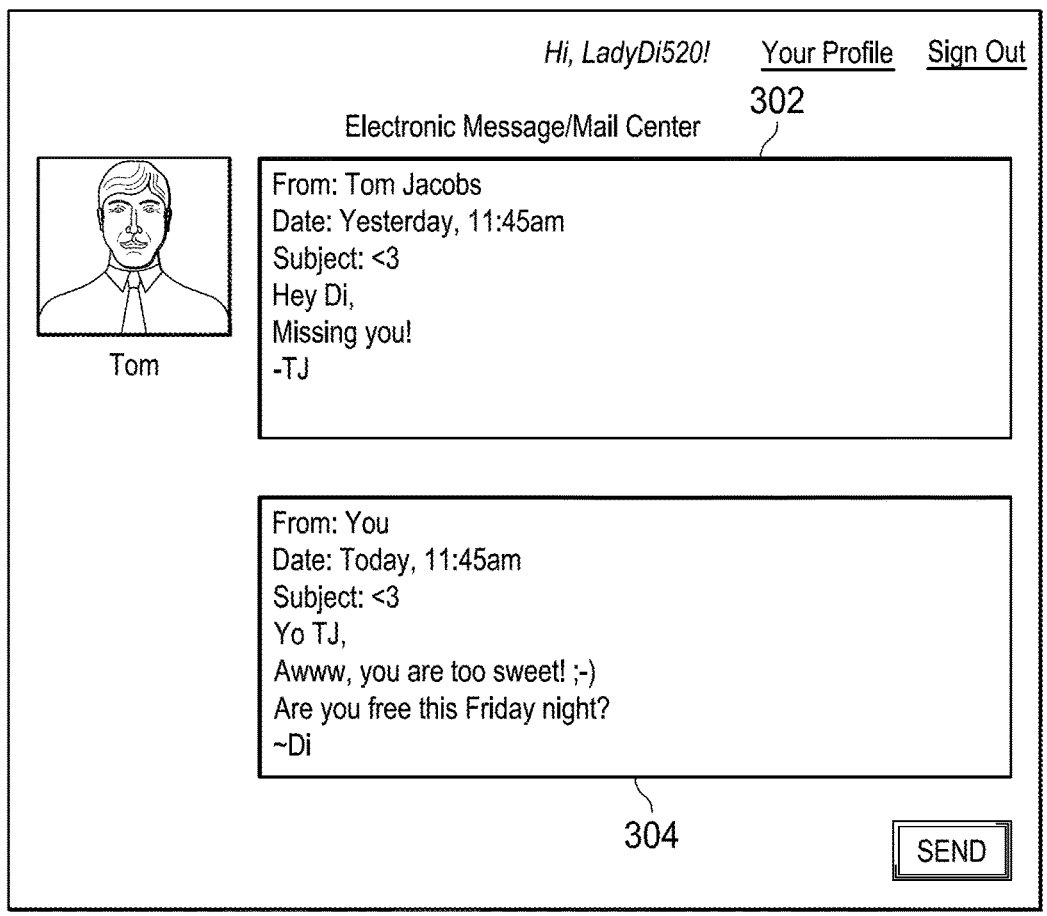
FIG. 3 shows a simplified screen shot of an example electronic communication protocol on an online social platform in accordance with some embodiments of the disclosure.

FIG. 3 shows a simplified screen shot of an example electronic communication protocol on an online social platform in accordance with some embodiments of the disclosure. Through a (graphical) user interface (e.g., an "Electronic Message/Mail Center") for facilitating transmitting and/or composing of electronic messages/mail, an end user (in this case LadyDi520) can receive and view an electronic message 302 from Tom Jacobs in a one-way electronic message/mail communication. In response, end user LadyDi520 can compose and send an electronic message 304 to complete a two-way electronic communication between "LadyDi520" and "Tom". Further messages may occur between the two end users, which may, in some cases, indicate an even higher level of engagement between two end users. Either or both Tom and LadyDi520 may transmit/receive/exchange electronic mail/messages with other end users. In some cases, messages may be exchanged among groups of end users (e.g., broadcast to every end user in a group as a multi-way form of electronic message/mail communication).

Electronic messages/mail may encompass any combination of short and/or long text messages, voice messages, video messages, and images, configured to carry substantive communication/information from one end user to one or more end users. The electronic messages/mail are (personally) composed by the end user transmitting the electronic messages/mail.

Generally speaking, mutual/two-way electronic message/mail communication tend to indicate a higher level of engagement than one-way electronic message/mail communication. Multi-way electronic message/mail communication may indicate a level of engagement that is between the level of engagement indicated by mutual/two-way electronic message/mail communication and the level of engagement indicated by one-way electronic message/mail communication, or in some cases, lower than the level of engagement indicated by one-way electronic indication of interest.

Heuristics Based on Indications of Interest

In one instance, the end user Tom may initiate a form of electronic communication to LadyDi520 in the form of a "wink" by clicking on the link/button 206 in FIG. 2H ("WINK AT HER"). The "wink" in this example constitutes an indication of interest/flirtation from Tom to LadyDi520.

Figure 4:
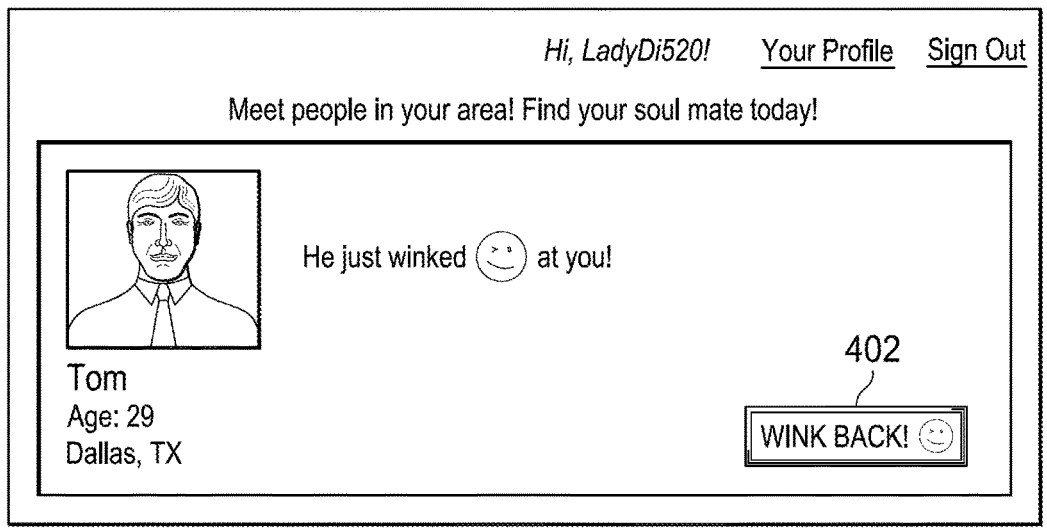
FIG. 4 shows another simplified screen shot of an example electronic communication protocol on an online social platform in accordance with some embodiments of the disclosure.

FIG. 4 shows another simplified screen shot of an example electronic communication protocol on an online social platform in accordance with some embodiments of the disclosure). As a result of the electronic communication, the "wink" may be received and viewed by LadyDi520, as shown in the screen shot of FIG. 4, which displays the identity of Tom and a message informing LadyDi520 that "He just winked at you" in a one-way form of electronic communication. LadyDi520 may wink back by clicking on the link/button 402 ("WINK BACK!") to complete a two-way electronic communication between Tom and LadyDi520 using "winks". The two-way electronic communication through the "winks" may indicate mutual interest between Tom and LadyDi520.

Generally speaking, because a "wink" (or some other feature similar to a "wink") merely indicates an interest through a feature provided on the online social platform, and does not involve providing/composing substantial communication (such as providing/composing text in an electronic message), the level of engagement indicated by a wink as a form of electronic communication is lower than the level of engagement indicated by electronic messages/mail. Besides a "wink" (an indication of interest) as a form of electronic communication, other indications of interest are envisioned. In some cases, the different indications of interest may indicate different levels of engagement, which could be determined based on prior knowledge and/or empirical models. Examples of other indications of interest include a "like" feature, a "yes!" feature, a "poke!" feature, a "favorite" feature (indicating an end user is one of his/her "favorites" by clicking on the link/button 210 of FIG. 2H ("FAVORITE"))., or a "follow" feature, which may be provided on the online social platform to allow an end user to indicate an interest in another end user. Generally speaking, mutual/two-way electronic indications of interest tend to indicate a higher level of engagement than one-way electronic indications of interest. Multi-way electronic indications of interest may indicate a level of engagement that is between the level of engagement indicated by mutual/two-way electronic indications and the level of engagement indicated by one-way electronic indication of interest, or in some cases, lower than the level of engagement indicated by one-way electronic indication of interest.

In some instances, Tom may electronically communicate an indication of interest that a target end user, e.g., LadyDi520, is a "maybe" by clicking on the link/button 208 of FIG. 2H ("MAYBE . . . "). Although the "maybe" indication is directed towards LadyDi520, LadyDi520 may or may not be aware of such an indication of interest (where the indication of interest is communicated to the online social platform, but not directly to LadyDi520). For instance, LadyDi520 may not be aware that Tom has indicated that she is (just) a "maybe". Accordingly, such forms of electronic communication may indicate a level of engagement between two end users that is (substantially) lower than the level of engagement indicated by forms of electronic communications receivable by the target end user. In some sense, the "maybe" indication does not involve much engagement between the end user providing the "maybe" indication and the target end user. Nonetheless, such forms of electronic communication which is communicated to the online social platform, but not directly to the target end user remains a useful heuristic which reflects the actual interests/desires of an end user providing these indications.

Indications of interest as various forms of electronic communication, such as "wink", "like", "follow", "yes!" "maybe", and "favorite", may also include indications of disinterest, which may in turn indicate a relatively lower level of engagement between two end users (e.g., because there is no engagement at all, or because the two end users are more likely disengaged from each other). For instance, an end user may indicate disinterest through features such as "dislike", "no", "no way", "ewwwww", "warn", "ignore", "block", "hide", etc.

In some embodiments, indications of interest as a form of electronic communication may include click throughs or page views, where one end user may have indicated an interest of another user by clicking on the other user's profile or viewing the other user's profile page. In some cases, a first end user's click through or page view of a second end user profile page is communicated to the second end user (e.g., "your profile has been viewed by . . . "). In some other cases, the first end user's click through or page view of the second end user is not communicated to the second end user. Because these click throughs or page views do not involve substantive communication (e.g., no messaging), this form of electronic communication may indicate a level of engagement that is lower than the level of engagement indicated by electronic messaging, etc.

Figure 5:
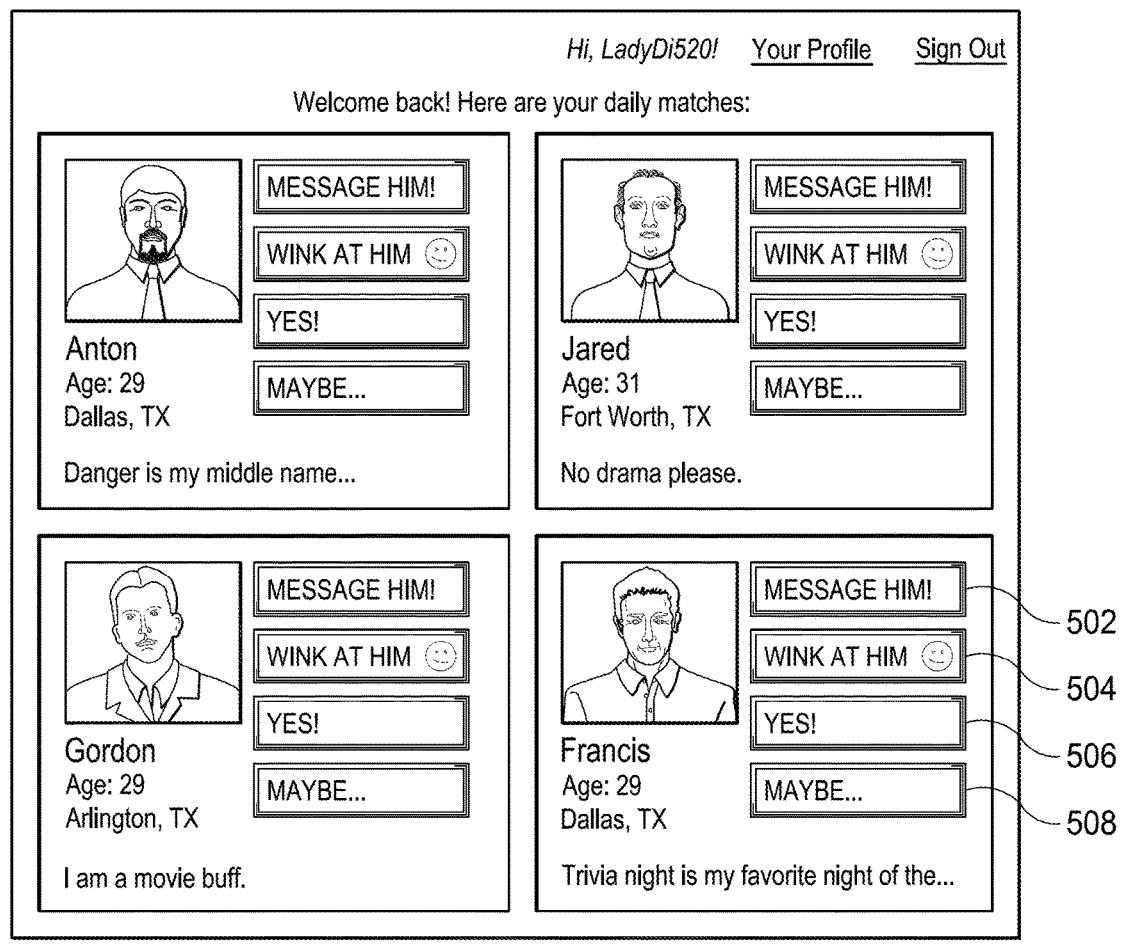
FIG. 5 shows another simplified screen shot of an example electronic communication protocol on an online social platform in accordance with some embodiments of the disclosure.

FIG. 5 shows another simplified screen shot of an example electronic communication protocol on an online social platform in accordance with some embodiments of the disclosure. In this screen shot, the end user "LadyDi520" is presented with a plurality of matches (e.g., daily matches, weekly matches, monthly matches, etc.) through the user interface. For instance, a brief user profile (e.g., having a user profile picture, age information, location information, and a short tag line) may be displayed for each match (e.g., end users "Anton", "Jared", "Gordon", and "Francis"). The above-mentioned features for facilitating electronic communications (e.g., messaging, mail, indications of interest) are also available in this user interface (or any suitable interface for allowing users to provide electronic communications directed to end users on the online social platform). For instance, "LadyDi520" may initiate electronic message/mail communication with an end user "Francis" by clicking on link/button 502 ("MESSAGE HIM!"). In another instance, "LadyDi520" may provide an electronic indication of interest in "Francis" by clicking on one or more of: link/button 504 ("WINK AT HIM"), link/button 506 ("YES!"), and link/button 508 ("MAYBE . . . ").

Applying Heuristics to Find Matches

By logging occurrences of electronic communications (e.g., messages, indications of interest) and identities of end users associated with the electronic communications, heuristics can be computed based on the level of engagement/interest indicated by these forms of electronic communication. Probabilities/score values for predicting whether an end user is a good match for another end user may be performed, e.g., by tabulating occurrences of these electronic communications among end users in the online social platform to identify a group of similar users (having similar desires/interests), and determining with whom these users in the group has communicated. A good match may be an end user who is very likely, based on past behavior (and other heuristics), to share mutual electronic communication with the end user to be matched.

A statistical model based on a system of heuristics may answer the questions "how likely will two given end users participate in some form of communication", "how strongly engaged is one end user with another end user," "how similar is one end user to another end user based on his/her interest in other end users", etc. The statistical model based on the system of heuristics and inferences can form a part of an algorithm for predicting whether a particular end user is likely to be a good match for another end user based on these electronic communications. Based on these predictions, the online social platform can improve the social chemistry among the end users.

Special Heuristic Based on Responses to Visual Cues

In certain embodiments, the question of "how similar is one end user to another end user" may be answered, based on a special questionnaire comprising of questions using (primarily) visual cues provided on the online social platform. The responses to the questions can be a useful heuristic which reflects the actual desires/interests of an end user if the questions are designed appropriately. Traditionally, matching occurs based on search criteria and/or user profile information provided through a text-based questionnaire. However, it has been discovered that these questionnaires are sometimes inadequate because the answers/response provided to these text-based questionnaires may or may not truly reflect the actual desires and interests of an end user. One inherent problem with text-based questionnaires is that users cannot easily represent or express subtle preferences (desires/interests) which cannot be or readily be verbalized by an end user (or that a text-based questionnaire cannot accurate capture those subtle preferences. For instance, it may be difficult for an end user to verbalize why they find a particular celebrity attractive or not attractive.

To overcome the shortcomings of the text-based questionnaires, end users may be asked to respond to a question not by providing a text-based answer, but by providing a user selection of one (or more) visual cues presented by the question (to provoke a more behavior/instinct-like response). If end users are provided with a questionnaire primarily based on visual cues, and end users are prompted to react to the visual cues in a question by selecting one or more visual cues, the responses are more likely to capture subtle desires and interests of an end user (i.e. preferences which cannot be verbalized easily in a text-based questionnaire). Accordingly, the responses to the special questionnaire can be used as an improved heuristic for determining how similar two end users are. Besides determining whether two end users are similar based on whether responses to the visual cues from these two end users are the same or similar, the special heuristic takes into the account of rarity: how rare the response is based on a pool of end users and/or the population of end users as a whole (a rarity variable). The rarer the same/similar response, the more impact the same/similar response on the overall similarity between two end users.

Figure 6:
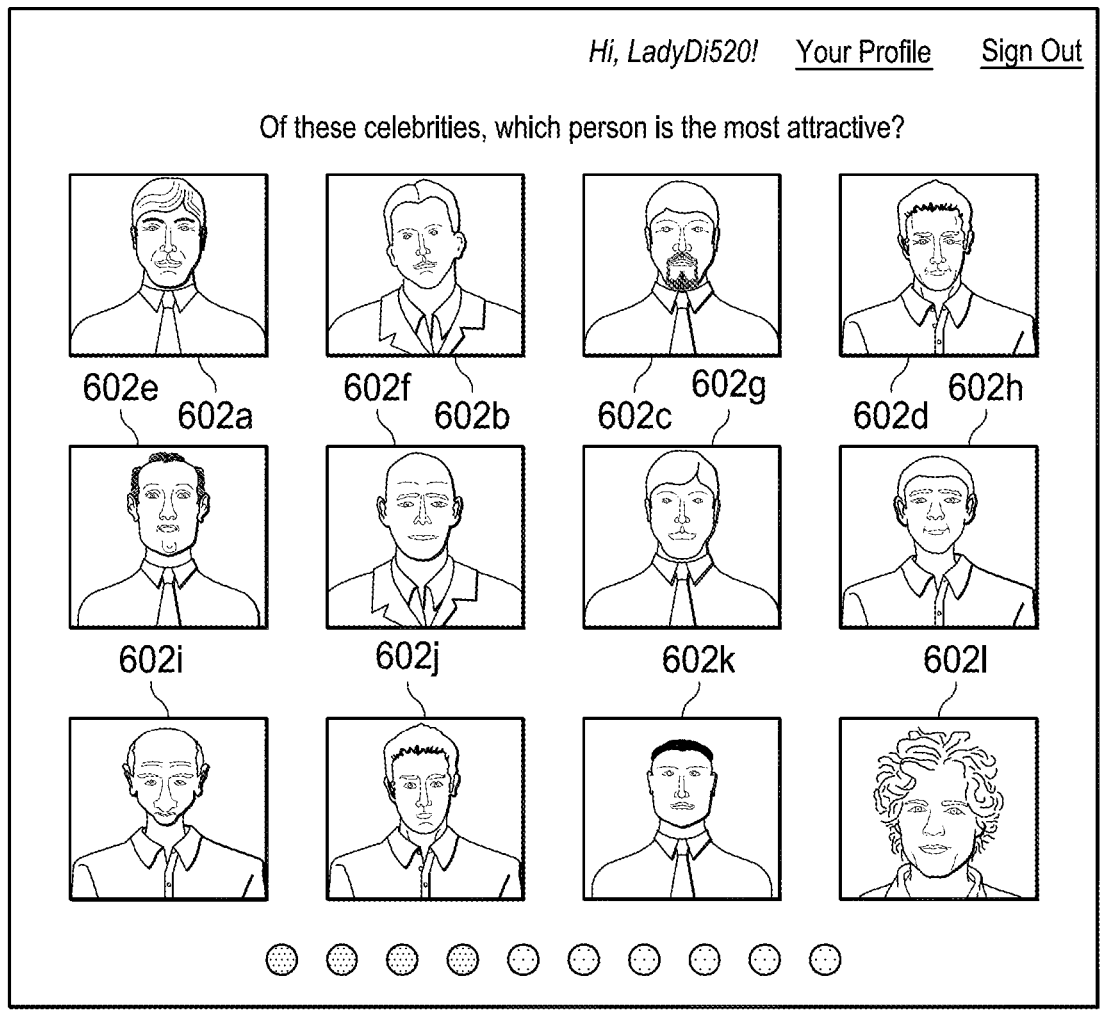
FIG. 6 shows a simplified screen shot of an example question of a questionnaire provided by an online social platform in accordance with some embodiments of the disclosure.

FIG. 6 shows a simplified screen shot of an example question of a questionnaire provided by an online social platform in accordance with some embodiments of the disclosure. In this example, the questionnaire includes a plurality of questions (e.g., 5, 10, 12, 15, etc.). The illustrative question shown in the screen shot in FIG. 6 may prompt an end user to select one or more visual cues 602a-l (e.g., photos of celebrities), and displays a question (e.g., "Of these celebrities, which person is the most attractive?"). An end user may provide to the online social platform through the user interface a user selection of one or more of the visual cues by clicking or selecting the visual cue or some other user interface element corresponding to the visual cue. For instance, the end user may select one of the photos (i.e., the visual cues) as the most attractive celebrity in response to the question. Responses to these questions in the questionnaire are logged and collected over time from a plurality of end users.

By using primarily visual cues in this special questionnaire, the choices/selections/responses received from end users over a plurality of questions may provide a useful (and more accurate) heuristic for determining how similar two end users are (e.g., whether two end users have similar desires and/or interests) because the subtle desires and/or interests are can be captured more easily from responses to visual cues (e.g., graphics, images, etc.) than response to text-based questions/choices. Based on this heuristic, an algorithm can determine group of end users similar to an end user to be matched (i.e., determine which users share similar interests/desires and how rare those similar interests/desires are) and predict good match(es) for the end user based on with whom the similar end users participated in some form of electronic communication.

Different Systems of Heuristics and Match Making Algorithms

FIG. 7-11 illustrates how different systems of heuristics can be provided to predict good matches for end users—end users who are likely to initiate/participate in some form of communication with an end user being matched. In these examples, the different systems of heuristics offer a complex approach to accurately predict good matches based on the heuristics which can be derived from different forms of electronic communication and responses to visual cues logged on the online social platform.

The basic principle in these match making algorithms, "triangulation", is to first generate a first set of end users who are similar to the end user to be matched. One or more heuristics may be used to determine the first set of end users who have similar interests/desires/behavior as the end user to be matched, e.g., based on whether one or more end users have participated in some form of electronic communication with the same end users with whom the end user to be matched has communicated, or based on whether one or more end users have provided similar answers to a questionnaire having visual cues as the end user to be matched. Then, these match making algorithms explore or discover a second set of end users with whom the similar end users in the first set has engaged in some form of electronic communication and/or in whom other end users the similar end users are interested. If the end user to be matched is similar to the end users in the first set, then it follows that the end user is likely to engage in some form of electronic communication with or is interested in the end users in the second set. One or more end users are then selected from the second set, e.g., using different heuristics, to determine who may be the best match for the end user to be matched.

A Hierarchical Approach: Match Making Through a Staged Process

Figure 7:
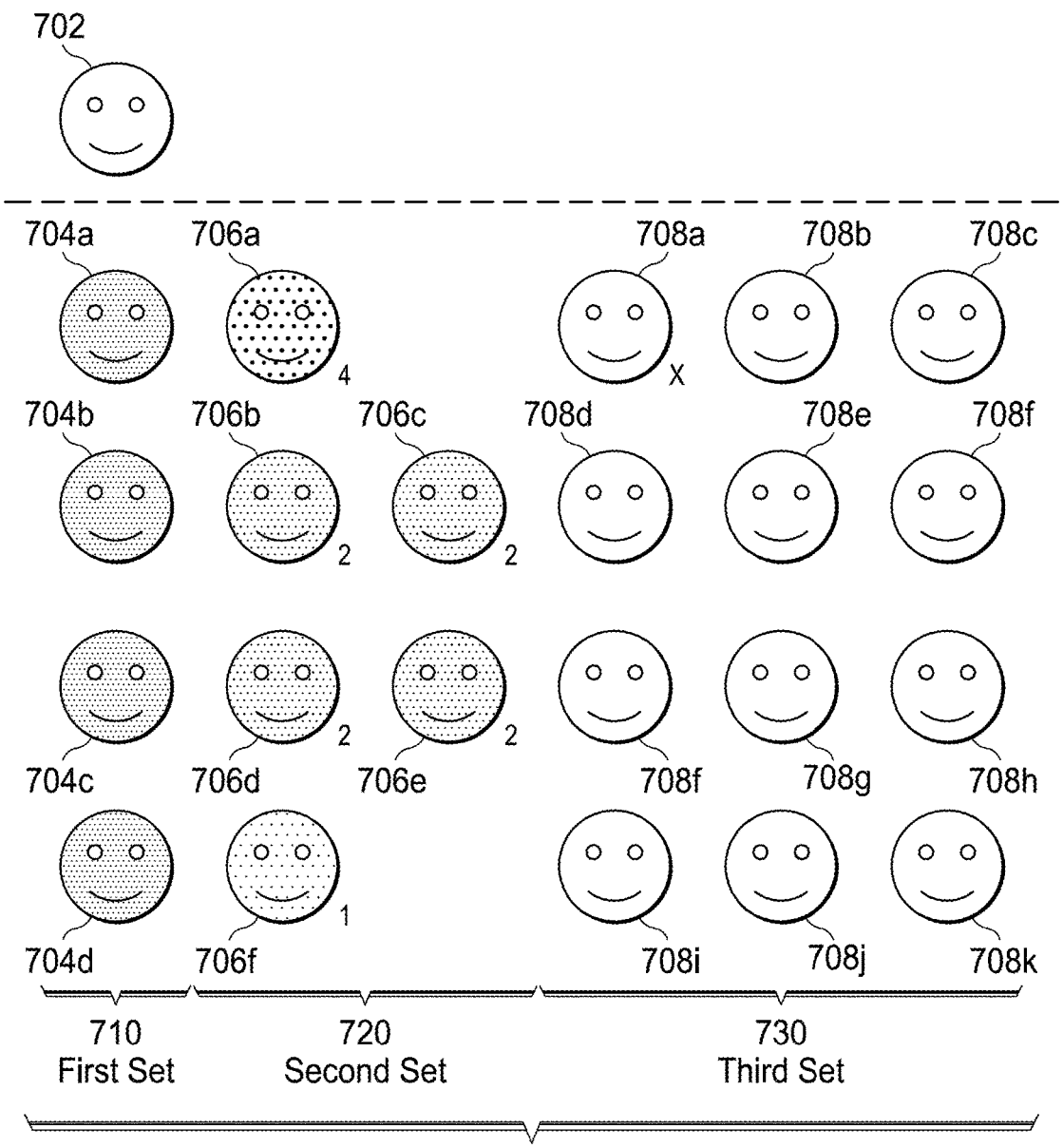
FIG. 7 shows illustrative sets of end users on an online social platform in accordance with some embodiments of the disclosure.

FIG. 7 shows illustrative sets of end users on an online social platform in accordance with some embodiments of the disclosure. A set of statistical models utilizing a system of heuristics provides a hierarchical approach to successively determine potential matches based on different forms of communication until a good matching end user is found. To find the best match, the hierarchical approach determines potential matches based on forms of electronic communication which indicates a higher level of engagement before other forms of electronic communication which indicates a lower level of engagement. The forms of electronic communication which indicates the higher level of engagement are generally better predictors for determining whether a potential match is likely to engage in some form of electronic communication with the end user to be matched. Thus, the quality of matching end users produced by the algorithm is improved. Furthermore, potential matches are evaluated based on other heuristics to improve match making.

Figure 8:
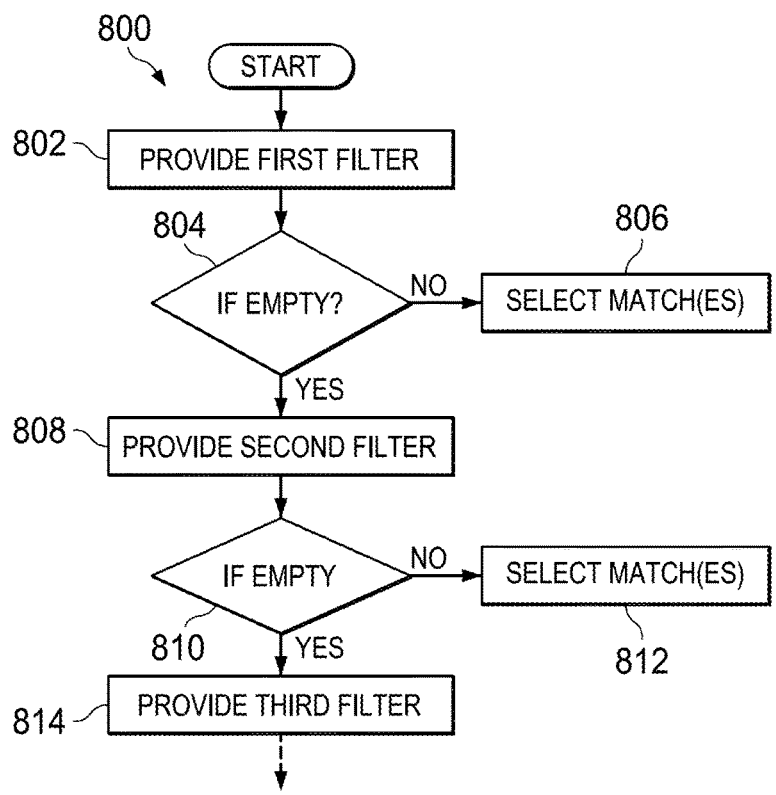
FIGS. 8 and 9 show exemplary flow diagrams illustrating exemplary methods for selecting one or more matching end users for an end user to be matched, according to some embodiments of the disclosure.

A method for selecting one or more matching end users for the end user 702 (herein referred to as "the end user to be matched" or "the end user being matched") is illustrated in FIGS. 7 and 8. In particular, the method can be used on an online social platform where end users participate in different forms of electronic communications with varying levels of engagement with other end users. A plurality of filters are provided, where each filter generates potential matches for an end user based on a heuristic derived from a particular form of electronic communication. Filters are applied successively until a good match is found.

In a first filter, the match making algorithm determines a first set 710 of end users, e.g., end users 704a-d. These four end users 704a-d are identified to be end users who have participated in a first form of electronic communication with the end user 702. For instance, end user 702 have mutually exchanged electronic messages with end users 704a-d.

Then, the match making algorithm determines a second set 720 of end users, e.g., end users 706a-f. These six end users 706a-f are identified to be end users who have participated in the first form of electronic communication with any one of the end users in the first set 710 (e.g., end users 704a-704d):

end user 706a has participated in the first form of electronic communication with all four of the end users 704a-d;

end user 706b and 706bc have each participated in the first form of electronic communication with three of the four end users 704a-d;

end user 706d and 706e have each participated in the first form of electronic communication with two of the four end users 704a-d; and end user 706f has participated in the first form of electronic communication with one of the four end users 704a-d.

These six end users 706a-f may be a group of end users who are similar to end user 702 because these six end users 706a-f and end user 702 have both participated in the first form of communication with one or more of the end users 704a-d. It can be inferred that the end users 706a-f may have similar interests/desires as end user 702. The match making algorithm then determines a third set 730 of end users, e.g., end users 708a-k, based on these end users 706a-f who are similar to end user 702. Specifically, the twelve end users 708 have participated in the first form electronic communication with one or more of the end users in the second set 720. If the end users 706a-706f in the second set 720 are similar to end user 702 and the end users 706a-706f in the second set 720 have engaged with end users 708a-k, then it is likely that end user 702 would also engage with end users 708a-k in the future (and further more they can be ranked such that better matches can be selected). Leveraging this past behavior of end users on the online social platform, these end users 708a-708k could be a good match for end user 702.

In some embodiments, one or more end users can be selected from the third set 730 as matching end user(s), and the end user 702 to be matched would be presented with the matching end users. By providing end users predicted to be a good match for end user 702, the match making algorithm can improve the chances of end user 702 finding another interesting/desirable end user on the online social platform with whom end user 702 would participate in some form of communication. Accordingly, the match making algorithm promotes better chemistry among end users on the online social platform.

In an ideal situation, the third set 730 of end users is non-empty, and one or more end users from the third set 730 can be selected and presented to the end user 702. However, it is possible that any one of the first set 710, the second set, the third set 730 is empty. For instance, it is possible that the end user 702 has not participated in the first form of electronic communication with any other end user in the online platform. Or, the end users in the first set 720 has not participated in the first form of electronic communication with any other end users in the online platform. Or, the end users in the second set 720 has not participated in the first form of electronic communication with any other end users in the online platform. In this situation, the match making algorithm provides a second filter. The second filter performs (almost) the same steps as the first filter, but in the second filter, the sets of end users are determined based on a second, different form of electronic communication. For instance, the second filter may determine the sets of end users based on two-way indications of interest between two end users.

The second filter in the match making algorithm begins by determining a fourth set of end user(s) who have participated in the second form of electronic communication with the end user 702. For example, each end users in the fourth set and end user 702 have "winked" at each other through the online social platform. Then, the second filter determines a fifth set of end user(s) who have participated in the second form of electronic communication with one or more end users in the fourth set of end users. After that, the second filter determines a sixth set of end user(s) who have participated in the second form of electronic communication with one or more end users in the fifth set of end users. If the second filter result in identifying a non-empty sixth set of end users, one or more end users are selected from the sixth set of end users as matching end users, and the matching end users may be presented to the end user 702.

This statistical/predictive model using a system of heuristics enables the match making algorithm to successively search for matching end users in a staged manner based on one form of electronic communication after another until one or more matching end users are identified. Moreover, statistical/predictive model enables the matching algorithm to continue to seek matching end users if the first filter fails to produce any (potential) matching end users.

In one example, the first form of electronic communication used in the first filter comprises mutual and/or two-way electronic message/mail communication between two end users, and the second form of electronic communication used in the second filter comprises mutual and/or two-way electronic indication of interest (e.g., "wink", "favorite", "like", etc.) between two end users. Generally speaking, mutual electronic message communication indicates a higher level of engagement/interest between end users than mutual electronic indication of interest between two users. That is, the level of engagement/interest between end users in the second set 720 and the end users in the third set is high. If the end user 720 to be matched is similar to the end users in the second 720, then the end user 720 to be matched is likely to also have a high level of engagement/interest with the end users in the third set 730. Accordingly, the heuristic predicting that any of the end users 708*a-k* in the third set in the first filter would make a good matching end user to end user 702 is a stronger predictor than the heuristic predicting that any of the end users in the sixth set in the second filter would make a good matching end user for end user 702. In other words, matching end users produced by the first filter based on mutual electronic message communication between end users are predicted to be more likely to engage in some form of communication with end user 702 in the future than the matching end users produced by the second filter based on mutual indication of interest. By applying the first filter before the second filter, better matching end users are discovered earlier, and the match making algorithm resorts to the second filter only when the first filter fails to produce any matching end users. More broadly speaking, the first form of electronic communication used in the first filter preferably indicates a level of engagement that is higher than the level of engagement indicated by the second form of electronic communication used in the second filter, such that the matching end users produced by the first filter are likely to be better matches than the matching end users produced by the second filter.

This successive method of providing one filter after another using the different forms of communication to produce different sets of potential matching end users can be beneficial to help end users find matching end users when some heuristics fail. In a rich online social platform, many other forms of electronic communication exists, thus making it possible to provide a system of heuristics within one or more statistical/predictive models. In a similar fashion as the first filter and the second filter, if the second filter does not result in identifying a non-empty first set of end users, the match making algorithm can provide successive filters to select one or more end users as matching end users for the end user 702 based on other form(s) of electronic communication between end users until a non-empty set of end users is generated.

FIG. 8 exemplary flow diagrams illustrating exemplary methods for selecting one or more matching end users for an end user to be matched, according to some embodiments of the disclosure. In the successive match making method 800, a first filter is provided at step 802. At step 804, the method checks if the results of the first filter are empty, i.e., no matching end users can be produced. If the results are not empty, one or more matching end users are selected at step 806. If yes, the method proceeds to provide a second filter at step 808. At step 810, the method checks if the results of the second filter are empty, i.e., no matching end users can be produced. If the results are not empty, one or more matching end users are selected at step 812. If yes, the method proceeds to provide a third filter at step 814, and so on. The successive method 800 can continue until one or more matches are selected, or until there are no filters left to use.

Preferably, the level of engagement between two end users indicated by the form of electronic communication used by each successive filter is substantially equal to or lower than the level of engagement indicated by the form of electronic communication used in the filter before. For instance, the level of engagement indicated by the first form of electronic communication and/or the level of engagement indicated by the second form of electronic communication are higher than a level of engagement between two users indicated by the other forms of electronic communication used in the later filters if the first filter and second filter failed to produce matching end users.

Eligibility Requirement(s) for the End User to be Matched

To ensure that an end user to be matched is a suitable candidate for any match making algorithm (or filters used therein), a pre-filter (or pre-check) can be applied to check whether the end user to be matched meets one or more eligibility criteria, prior to running a match making algorithm.

In another example, the match making algorithm would only work if the end user to be matched has sufficient information in the user profile to assist in selecting a matching end user. The pre-filter may then determine whether the end user to be matched has a user profile, has a completed user profile (or a profile that has sufficient information), has a user profile which has been approved by an administrator of the online social platform, etc.

In a yet further example, the match making algorithm, in particular, the statistical/predictive model utilizing a system of heuristics, would work properly/well if the end user to be matched has been sufficiently active with enough past behavior (in some cases, especially enough past behavior that is recent). The pre-filter may then determine whether the end user has logged into the online social platform during a recent period of time (e.g., the past week, the past 30 days, the past 90 days, the past year, etc.), and/or whether the end user has been sufficiently active on the online social platform (e.g., by tabulating user activity/past behavior in the log of electronic communications occurrences on the online social platform).

Non-Profile Specific Eligibility Requirements to be a Matching End User

When executing any of the match making algorithms herein, some requirements may be imposed to ensure that potential matching end users (i.e., a pool/set of end users from which matching end users are selected) would make a suitable matching end user, or an eligible end user to be matched with the end user to be matched. If one or more of these eligibility requirements are not met, the potential matching end user may be excluded from being selected as a matching end user.

In another example, the match making algorithm may check whether the potential matching end user has been sufficiently active on the online social platform, e.g., whether the potential matching end user has logged into the online social platform during a recent period of time (the past week, the past two weeks, the past 30 days, etc.). This check ensures that this potential matching end user has sufficient past behavior (in some cases, especially recent past behavior/activity) from which heuristics can be derived. Furthermore, this check ensures that this potential matching end user is an end user who is likely to engage in some form of communication with another end user in general, i.e., as someone who would promote better chemistry among end users. This avoids matching an end user with a potential matching end user who is never logged in, or doesn't like to communicate with others, etc.

In yet another example, the match making algorithm checks whether the potential matching end user as a sufficiently presentable user profile for presenting the potential matching end user to the end user to be matched. If the user profile of the potential matching end user is not presentable or has insufficient information, the end user to be matched would be less likely to initiate some form of communication with the potential matching end user. In one instance, the match making algorithm may check whether the potential matching end user has an (approved) user profile photo. If the potential matching end user doesn't have an (approved) user profile photo, it would be undesirable to display/present the potential matching end user as a match if the end user to be match cannot see/judge a photo of the potential matching end user (making it less likely for the end user to be matched to initiate some form of communication with that potential matching end user).

In a yet further example, the match making algorithm checks whether the potential matching end user has blocked the end user to be matched from any future communications from the end user to be matched. If that is the case, the match making algorithm respects the desire of the potential matching end user and would not present the potential matching end user as a matching end user to the end user to be matched. The match making algorithm may (also) check whether the end user to be matched has blocked the potential matching end user from any future communications from the potential matching end user. If that is the case, the potential matching end user is likely not an end user the end user to be matched would initiate or sustain some form of electronic communication. Any one-way or two-way blocking between the end user and the potential matching end user are red flags indicating that the two end users are unlikely to communicate with each other or make a good match. These potential matches are prevented through this check.

In some further examples, the match making algorithm checks whether the potential matching end user has already been matched (or selected as a matching end user) with the end user to be matched in the past (or recent past). This ensures that any potential matching end user being presented as a matching end user is a "fresh" match, i.e., an end user that the end user being matched has not seen/viewed or interacted with before. The match making algorithm may (also) check whether the end user to be matched has ranked or rated the potential matching end user in the (recent) past. This ensures that any potential matching end user being presented as a matching end user is not an end user that the end user to be matched has already considered. Such a feature encourages end users to be matched to seek out other potential matching end users outside the group of end users that the end users to be matched have already communicated with. The match making algorithm may (also) check whether the potential matching end user has already participated in some form of electronic communication with the end user to be matched in the (recent) past. If the two end users have already interacted with each other before, there is no real need to present the potential matching end user to the end user as a match because they may already be a match for each other (i.e., presenting the potential matching end user does not add any value to the chemistry that already exists on the online platform).

Profile-Specific Eligibility Requirements to be a Matching End User

When executing any of the match making algorithms herein, some further requirements may be imposed to ensure that potential matching end users (i.e., a pool/set of end users from which matching end users are selected) would make a suitable matching end user based on user profile information of the potential matching end user and/or the user profile information of the end user to be matched. User profile information within this context includes information describing the end user, and/or information provided by the end user in the search/seek criteria for other users.

It has been discovered that while heuristics based on past behavior may find great matching end users for end users on the online social platform, in some cases, match making algorithm should respect some search criteria that is specified by an end user (or respect to a certain degree). These selected search criteria to respect have been discovered to be important factors in determining whether a potential matching end user would make a good match for the end user to be matched. If one or more of these eligibility requirements are not met, the potential matching end user may be excluded from being selected as a matching end user. Or in some cases, if one or more these eligibility requirements are met, a variable representing the eligibility requirement may contribute positively when determining whether the matching end user is a good match. If one or more of these eligibility requirements are not met, a variable representing the eligibility requirement may contribute negatively when determining whether the matching end user is a good match.

When a potential matching end user is judged whether it is a good match or not a good match, a subset of eligibility requirements may be an absolute requirement (like a filter), while a subset of eligibility requirements may be relaxed such that the requirement is less strict. The relaxation of eligibility requirements may relate to an important concept where end users may find another end user to be a good match even when some of the requirements are not met (exactly). Relaxation of requirements may come in three flavors. A first flavor of relaxation of requirements may relax a requirement by default, to advantageously encourage end users to be matched to consider potential matching end users beyond the specified requirement. A second flavor of relaxation of requirements may relax a requirement if one or more conditions are met (upon the end user to be matched and/or the potential matching end user), to advantageously allow end users to make trade-offs when considering a potential matching end user. For instance, a potential matching end user may still make a good match even if one requirement is not met but the potential matching end user has another characteristic/feature which is desirable to the end user to be matched. A third flavor of relaxation of requirements may make a requirement absolute (otherwise normally relaxed by default), if one or more conditions are met (upon the end user to be matched and/or the potential matching end user), to capture the situation where making trade-offs on one or more requirements is unlikely or undesirable.

It is noted that the following examples are merely illustrative, actual implementations of this technology may not be limited to the following examples. Any combination of the following examples may be used.

For example, a match making algorithm may determine whether the potential matching end user meets a gender requirement provided in the search criteria of the end user to be matched. The match making algorithm may check whether the gender information of the potential matching end user matches the gender requirement specified by the end user to be matched. Furthermore, the match making algorithm may check whether the gender information of the end user to be matched matches the gender requirement specified by the potential matching end user. The gender requirement may be checked both ways to ensure mutual compatibility.

In another example, a match making algorithm may determine whether the potential matching end user meets a distance requirement provided by the end user to be matched. The match making algorithm may check whether the location information of the potential matching end user meets a search radius requirement specified by the potential matching end user. Furthermore, the match making algorithm may check whether the location information of the end user to be matched meets a search radius requirement specified by the potential matching end user. The distance requirement may be checked both ways to ensure mutual compatibility.

In some cases, the distance requirement is relaxed by a buffer to allow potential matching end users slightly beyond the search radius of the end user to be matched to still be presented as a matching end user (prompting the end user to be matched to consider end users he/she may not normally consider or see in the search results).

In yet another example, a match making algorithm may determine whether the potential matching end user meets an age requirement provided by the end user to be matched. The match making algorithm may check whether the age information of the potential matching end user meets an age range requirement specified by the potential matching end user. Furthermore, the match making algorithm may check whether the age information of the end user to be matched meets an age range requirement specified by the potential matching end user. The age requirement may be checked both ways to ensure mutual compatibility.

In some cases, the age requirement is relaxed by a buffer (e.g., X number of years beyond the specified age range) to allow potential matching end users slightly beyond the age range of the end user to be matched to still be presented as a matching end user (prompting the end user to be matched to consider end users he/she may not normally consider or see in the search results).

In a yet further example, a match making algorithm may determine whether the potential matching end user meets a height range requirement provided by the end user to be matched. The match making algorithm may check whether the height information of the potential matching end user meets a height range requirement specified by the potential matching end user. Furthermore, the match making algorithm may check whether the height of the end user to be matched meets a height range requirement specified by the potential matching end user. The height range requirement may be checked both ways to ensure mutual compatibility.

In some cases, the height range requirement is relaxed by a buffer to allow potential matching end users slightly beyond the height range requirement of the end user to be matched to still be presented as a matching end user (prompting the end user to be matched to consider end users he/she may not normally consider or see in the search results).

More interestingly, the height range requirement may be relaxed by a buffer unless the end user to be matched is relatively tall or relatively short, to capture the idea that the height range requirement may be more absolute when a potential match is at the (very) tall or (very) short end of the height range among end users. Accordingly, the buffer is not applied to better respect the height range requirement as specified by the end user.

In some other examples, a match making algorithm may determine whether the potential matching end user meets an ethnicity requirement provided by the end user to be matched. The match making algorithm may check whether the ethnicity information of the potential matching end user meets an ethnicity requirement specified by the potential matching end user. Furthermore, the match making algorithm may check whether the ethnicity information of the end user to be matched meets an ethnicity requirement specified by the potential matching end user. The ethnicity requirement may be checked both ways to ensure mutual compatibility. Similarly, the match making algorithm may perform these checks for one or more of the following: a religion requirement, drinking preference, smoking preference, children preference, etc. A one-way or a two-way check between the end user to be matched and the potential matching end user may be performed.

Determining Score Values for Potential Matching End Users

The match making algorithms disclosed herein generally generate a prioritized/ranked set of potential matching end users, i.e., a pool/set of end users from which matching end users are selected, and selects one or more end users from the set of potential matching end users to be presented to the end user to be matched as a match. Thus, not all potential matching end users would be presented to the end user. The selection process may include determining/computing probabilities/score values for these potential matching end users. Using the probabilities/score values, the selection process can select the better potential matching end users from the set of potential matching end users.

Figure 9:
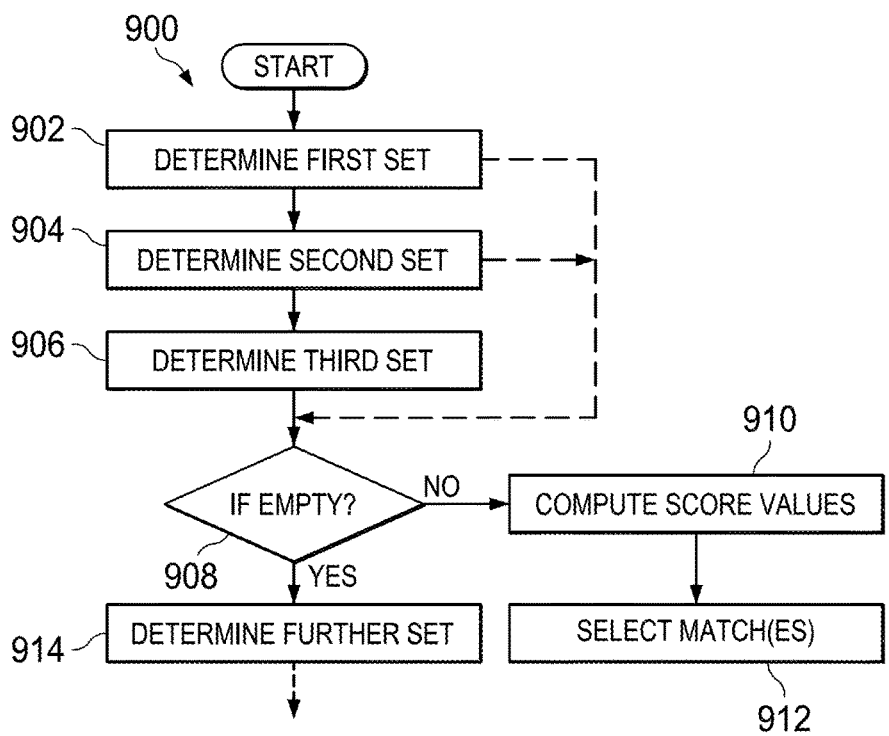

FIG. 9 shows exemplary flow diagrams illustrating exemplary methods for selecting one or more matching end users for an end user to be matched, according to some embodiments of the disclosure. At step 902, a match making algorithm determines a first set of end user(s) who have participated in a first form of electronic communication with the end user to be matched. At step 903, a match making algorithm determines a second set of end user(s) who have participated in the first form of electronic communication with one or more end users in the first set of end users. This second set of end users forms the pool of end users who are similar to the end user being matched. At step 906, the match making algorithm determines a third set of end user(s) (users who are potential matching end users) who have participated in the first form of electronic communication with one or more end users in the second set of end users.

The match making algorithm may first check of the third set is an empty set at step 908. If the set is non-empty, the match making algorithm proceeds to step 910 to compute score values for the potential matching end users. Based on the score values, one or more end users are selected from the set of potential matching end users as matching end users at step 912. If the set is empty, the match making algorithm may proceed in a staged process to determine further sets of end users at step 914 using other forms of electronic communication. If the first set is empty, or the second set is empty, the match making algorithm may proceed directly to step 914 to determine further sets based on participating in a form of electronic communication different from the first form of electronic communication (in some cases, a form of electronic communication that indicates a lower level of engagement than the level of engagement indicated by the first form of electronic communication).

In some cases, a ranking may be provided using the probabilities/score values computed in step 910. The ranking may enable the selected matching end users to be presented according to a certain order corresponding to the ranking (e.g., from the best matching end user to the worst matching end user). In some cases, the potential matching end user(s) with the highest/best probability(-ies)/score value(s) are selected and presented to the end user to be matched. In some other cases, the potential matching end user(s) with probability(-ies)/score value(s) meeting a certain threshold are selected and presented to the end user to be matched. In some embodiments, the probability(-ies)/score value(s) do not matter, and the match making algorithm selects one or more matching end users from the set of potential matching end users at random.

In one embodiment, the match making algorithm determines score values for potential matching end users. A score value for a potential matching end user may indicate the likelihood that the end user to be matched would engage in some form of electronic communication with the potential matching end user. Such a score value may include one or more variables. To compute a score value, the variables may be combined through summation and/or multiplication, a voting mechanism, or any other suitable combination of variables. In some embodiments, the score value is a sum of products (e.g., a weighted sum), wherein each product comprises a coefficient (a weight) and a variable. The coefficient preferably corresponds to the strength of the variable as a predictor for a good match, or the effect of the variable on the probability that two end users would find each other as a good match. Furthermore, the coefficient encapsulates whether a variable is a positive contributor to the overall score value or a negative contributor to the overall score value. The score value may represent a probability that the particular end user will engage in one form of electronic communication with the end user to be matched, and the sum of products are provided based on a logistic regression model for computing the probability.

One variable may include a triangulation score, wherein the triangulation score is computed based on the strength of past behavior/activity among end users. A triangulation score may be computed in different ways. In some embodiments, the triangulation variable is based on or correlated to the number of end users(s) in the second set of end users with whom the potential matching end user has participated in the first form of electronic communication.

To illustrate, FIG. 7 provides examples for different ways how the triangulation score may be computed. Consider the potential matching end user 708*a* in the third set 730 has a triangulation score X. In this illustration, potential matching end user has participated in a first form of electronic communication (or whichever form of electronic communication is used for determining the sets) with end user 706*a*, 706*b*, 706*c*, and 706*f*. In one embodiment, the triangulation score X is a score of 4 for the four end user 706*a*, 706*b*, 706*c*, and 706*f* (4=1+1+1+1). This triangulation score takes into account the strength of consensus among the end users in the second set 720 who are similar to the end user to be matched. In another embodiment, the triangulation score X is tabulated differently. Suppose end user 706*a* has participated in the first form of electronic communication with all four end users 704*a-d* in the first set 710, end users 706*b-c* have participated in the particular form of electronic communication with two of the end users in the first set 710, and end user 706*f* has participated in the particular form of electronic communication. The triangulation score X may be a score of 4+2+2+1=7, which is tabulated based on each end user in the second set 720 with whom the potential matching end user has participated in the first form of electronic communication, and the number of end users in the first set 710 with whom the end user in the second set has participated in the first form of communication. Such a tabulation for the triangulation score not only takes into account the consensus among the end users in the second set 720, it takes into account also how similar the end user to be matched is with the end user in the second set 720 (based on how many end users in the first set 710 with whom the end user in the second set has participated in the first form of communication.

A high triangulation score indicates strong past behavior between the potential matching end user and end users who are similar to the end user to be matched. The score value is rewarded by a (high) triangulation score, and the coefficient corresponding to the triangulation score is preferably positive such that the triangulation term (i.e., the triangulation coefficient×the triangulation score) makes a positive contribution to the overall score value. In some cases, if the triangulation score is a stronger predictor heuristic than other variables, then the triangulation term (i.e., coefficient corresponding to the triangulation score×the triangulation score) is preferably greater than the other terms corresponding to the other variables when the triangulation score is high (within its range). In some cases, if the triangulation score is substantially zero (e.g., within a threshold above zero), then the coefficient is negative such that the triangulation term (this could be a second triangulation term in addition to the triangulation term with the positive coefficient variable) makes a negative contribution to the overall score value.

One variable may include a distance between the end user to be matched and a potential matching end user (the distance variable can be computed from the location information in the user profile of the end user and the potential matching end user). In some situations where the online social platform aims to promote real-life interaction between its end users, distance between two end users is an important variable in determining how likely two end users would find each other a good match, or initiate/maintain some form of communication with each other. Some end users are not willing to travel beyond a certain distance, or finds other end users who are located nearby more convenient/easier to have a relationship. Accordingly, the score value is penalized by the distance variable, the distance variable is contributes to the score value negatively (the farther the distance, the greater the negative impact on the score value). In some cases, the coefficient or weight corresponding to the distance variable is negative than the other coefficients corresponding to other variables.

One variable may be based on whether the potential matching end user has previously indicated an interest in the end user to be matched as a "maybe" or "save for later", where the indication of interest was not communicated to the end user to be matched. In other words, the end user to be matched has not communicated directly with the potential matching end user, but the potential matching end user has a (slight) interest in the end user to be matched. These indications may suggest that the end user to be matched may maintain some form of electronic communication with the potential matching end user because of the potential matching end user's past (but slight) interest in the end user to be matched. When the end user to be matched initiates a form of electronic communication with that potential matching end user who had previously selected "maybe" for the end user to be matched, it may be more likely that the potential matching end user would maintain the form of electronic communication with the end user to be matched. The coefficient for this variable may be a positive coefficient which rewards the potential matching end user who had previously indicate an interest in the end user to be matched (i.e., this variable contributes positively to the score value).

Variables may include one or more search criteria variables (e.g., Boolean variables) based on based on whether the potential matching end user has user profile attributes which meets the search criteria of the end user to be matched. These variables may independently contribute to a higher score value. Search criteria variables may include one or more of an age variable based on whether the user profile attributes of the particular end user is within an age range requirement in the search criteria of the end user to be matched, a body type variable based on whether the user profile attributes of the particular end user meet a body type requirement in the search criteria of the end user to be matched, an ethnicity variable based on whether the user profile attributes of the particular end user meet an ethnicity requirement in the search criteria of the end user to be matched, a smoking variable based on whether the user profile attributes of the particular end user meet a smoking preference in the search criteria of the end user to be matched, a marital status variable based on whether the user profile attributes of the particular end user meet a marital status requirement in the search criteria of the end user to be matched, a drinking preference variable based on whether the user profile attributes of the particular end user meet a drinking preference in the search criteria of the end user to be matched, a faith/religion variable based on whether the user profile attributes of the particular end user meet a faith/religion requirement in the search criteria of the end user to be matched. The score value may be rewarded (not penalized) if the search criteria variable indicates a match in a particular search criteria. The score value may be penalized (or not rewarded) if the search criteria variable indicates a mismatch in a particular search criteria (e.g., the variable may become a negative contributor to the score value).

It has been discovered that end users to be matched from different demographics, e.g., women, men, age group, region, etc., may require different set of variables, because certain factors are present or particularly relevant in predicting whether two end users would make a good match or not a good match, while some other factors may not be present or particularly less relevant. More specifically, it has been discovered that end users to be matched who are female may care more about some search criteria variables than end users who are male, and vice versa. To compensate for the different demographics, the set of one or more search criteria variables used when the end user to be matched is female may differ from the set of one or more search criteria variables used when the end user to be matched is male. Some search criteria variables may be exclusively used for matching other end users to end users who are female or for matching other end users to end users who are male.

In one example, the one or more search criteria variables used if the end user to be matched is female include an education variable based on whether the user profile attributes of the potential matching end user meets an education requirement in the search criteria of the end user to be matched and/or a height variable based on whether the user profile attributes of the potential matching end user meets a height range requirement in the search criteria of the end user to be matched.

In another example, the one or more search criteria variables used if the end user to be matched is male include a children variable (e.g., have kids or wants kids) based on whether the user profile attributes of the potential matching end user meets a children preference in the criteria of the end user to be matched. In yet another example, the one or more search criteria variables used if the end user to be matched is male include an age difference variable based on the difference between the age of the potential matching end user and the age of the end user to be matched.

In some cases, the one or more search criteria variables may be further based on a positive ratings score of the potential matching end user (e.g., a score representative of how well received this potential matching end user by other end users on the online social platform). The positive ratings score may be a score based on ratings submitted by other end users on the online social platform, page views, and/or rankings based on other factors. The positive ratings score as part of the search criteria variable may advantageously allow a mismatch in one or more search criteria variables to have a less negative impact on the score value (e.g., as a trade-off). If the potential matching end user is well received, it is possible that a mismatch in one or more search criteria variables may matter less to the end user to be matched. A variable which further accounts for the positive ratings score of the potential matching end user rewards potential matching end users who are well received by other end users on the online social platform, suggesting that the end user to be matched would also find this potential matching end user to be a good match.

In some cases, end user to be matched from different demographics may require different sets of coefficients as well. For instance, the coefficients used in computing the score values for the potential matching end users if the end user to be matched is female differ from the coefficients used for each variable if the end user is male.

It has also been discovered that different sets of potential matching end users determined based on different forms of electronic communication (e.g., from the staged process of determining sets of potential matching end users) may also require a different set of variables and/or a different set of coefficients for predicting whether the potential matching end users are a good match. In one example, because the different forms of electronic communication indicate different levels of engagement, the different forms of electronic communication may serve as heuristics that have different strengths. (Also, the variables may serve as heuristics with different strengths as well depending on how the potential matching end users are determined). A heuristic or variable's strength or effect on the overall likelihood whether two end users would make a good match or not can be in part reflected in the score value through the different coefficients corresponding to the heuristic or variable.

Applying Responses to Visual Cues as a Heuristic

Figure 10:
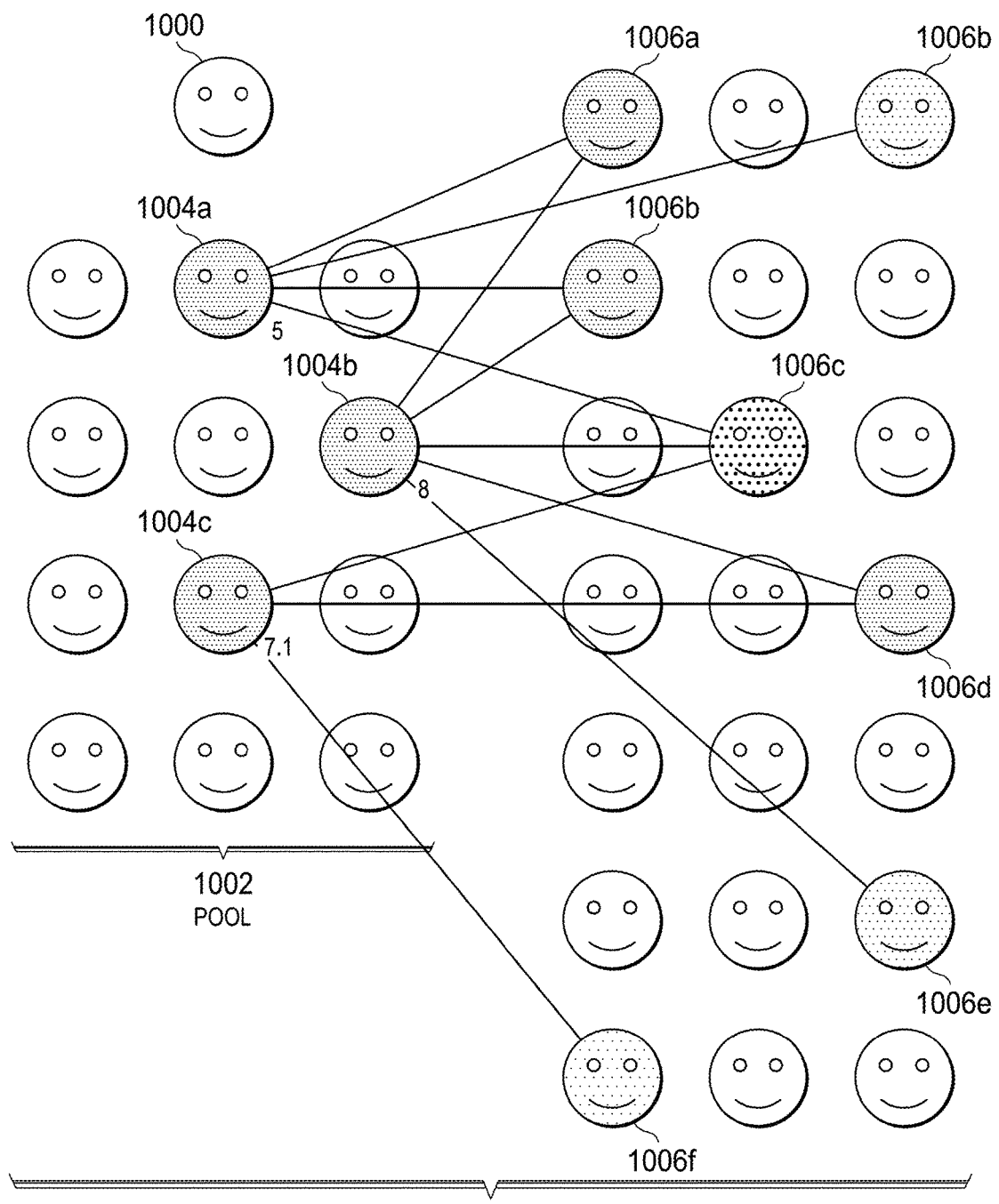
FIG. 10 shows illustrative end users on an online social platform in accordance with some embodiments of the disclosure.

FIG. 10 show illustrative end users on an online social platform in accordance with some embodiments of the disclosure. The basic principle is to select end users (e.g., end users 1004a-c) who are similar to an end user 1000 from a pool 1002 of end users, and then determine with whom the similar end users have participated in some form of electronic communication (e.g., end users 1006a-g). Because the selected end users from the pool 1002 are similar to the end user 1000 to be matched, the end user 1000 to be matched is likely to also participate in some form of electronic communication with the end users with whom the selected end users in the pool 1002 have communicated (e.g., end users 1006a-g).

In this illustration, end user 1004a has participated in a first form of electronic communication with end user 1006a, 1006b, 1006c and 1006g. End user 1004b has participated in the first form of electronic communication with end user 1006a, 1006b, 1006c, 1006d, and 1006e. End user 1004c has participated in the first form of electronic communication with end user 1006c, 1006d, and 1006f. Any one of end user 1006a-g may make a good matching end user with the end user 1000 to be matched.

Figure 11:
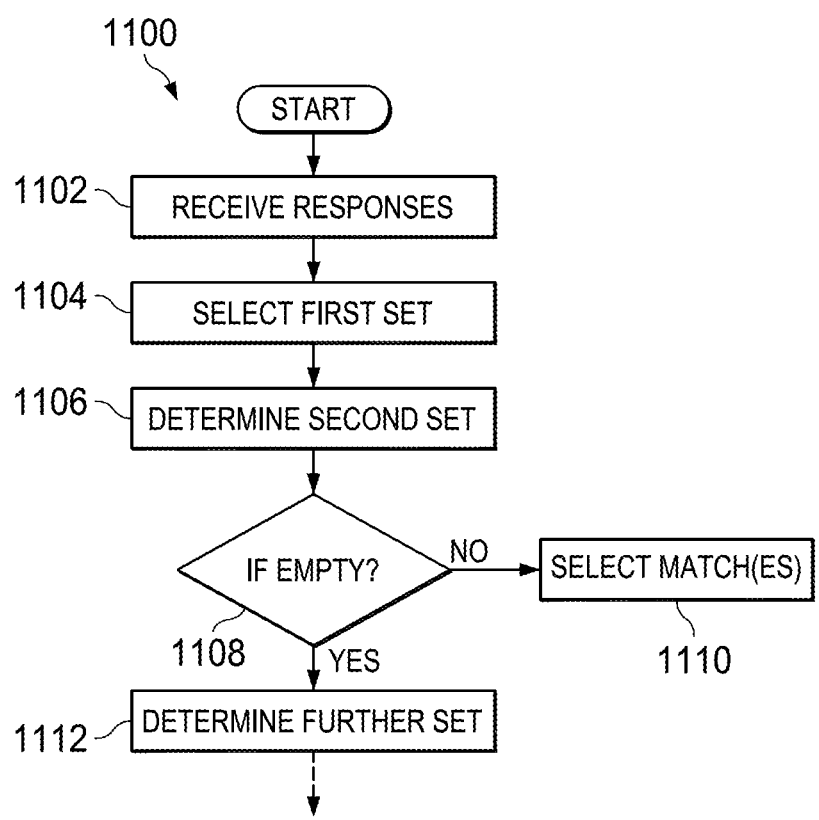
FIG. 11 shows an exemplary flow diagram illustrating exemplary methods for selecting one or more matching end users for an end user to be matched, according to some embodiments of the disclosure.

FIG. 11 shows an exemplary flow diagram illustrating exemplary methods for selecting one or more matching end users for an end user to be matched, according to some embodiments of the disclosure. In contrast from some other match making algorithms that examines the end users with whom end user 1000 has participated in some form of electronic communication, the pool of end users similar to the end user 1000 are generated based on how similar end users' responses are to the visual cues in a special questionnaire. At step 1102, the online social platform receives and logs responses from end users to a plurality of questions provided by the online social platform, wherein a response indicates a user selection from a plurality of visual cues presented by a question (step 1102). Then, the match making algorithm selects a first set of end user(s) (e.g., end users 1004a-c in FIG. 10) from a pool of end users (e.g. pool 1002 in FIG. 10) using a similarity score computed for each end user in the pool based on the responses received from the end user being matched and the responses received from the end users in the pool and the rarity of the responses. (step 1104). Based on the past behavior of the first set of end users, the match making algorithm determines a second set of end user(s) (e.g., end users 1006a-g in FIG. 10), wherein the end users in the second set of end users have participated in a first form of electronic communication with the end users in the first set of end users (step 1106). The match making algorithm then selects one or more end users (e.g., any of end users 1006a-g) from the second set of end users as the one or more matching end users, i.e., the second set of end users being a set of potential matching end users (step 1110), if the first set and the second set are non-empty (step 1108). If the second set is an empty set, the match making algorithm determines one or more further sets based on other forms of electronic communication (e.g., forms of electronic communication which indicate a successively lower level of engagement) by determining end users who have participated in those other forms of electronic communication with the end users in the first set (step 1112). For instance, the first form of electronic communication used in determining the second set (step 1106) may include two-way electronic message/mail communication, and the other forms of electronic communication used in determining further set(s) (step 1112) may include one-way electronic message/mail communication, two-way indications of interest, one-way indication of interest, etc.

To determine which one or more end users to select from the end users in the pool 1002 of FIG. 10, a similarity score may be calculated for each end user in the pool 1002 to assess how similar an end user in the pool 1002 is with the end user 1000 to be matched. In some embodiments, the similarity score for a particular end user in the pool 1002 is based on how many number of questions in which the end user to be matched and the particular end user in the pool 1002 have provided (substantially) the same response and how rare the same response was among the pool of users. In some other embodiments, the similarity score is computed based on a similarity variable per question based on whether the user selection (i.e., the response) made by the user being matched and the user selection made by the particular end user in the pool 1002 are the same (e.g., a Boolean variable), and a rarity/proportion variable (e.g., a percentage, or a fraction) based on the number of end users who made the same user selection over the number of end users in the pool of users. The similarity variable and the proportion variable together makes up a "weight" per question. The the weights which make up the similarity score tend to correlate positively to the similarity variable, and but negatively to the proportion variable. For instance, the weight per question is computed by dividing the similarity variable proportion variable to obtain a quotient for each question. The similarity score may comprise a sum or a product of the quotients calculated for the plurality of questions. An example of the similarity score and respective weights for 5 questions is shown in the table below:

| Ques. | User1 Answer | User2 Answer | # of Users Who Answered the Ques | # of Users Who Also Answered Same | % of Users Who Answered Same | Weight |
|---|---|---|---|---|---|---|
| 1 | A | A | 10 | 4 | 0.4 | 2.5 |
| 2 | A | B | 10 | 2 | 0.2 | 0.0 |
| 3 | C | D | 10 | 6 | 0.6 | 0.0 |
| 4 | E | E | 10 | 10 | 1 | 1.0 |
| 5 | F | G | 10 | 8 | 0.8 | 0.0 |
| Total Similarity Score for User2 | | | | | | 3.5 |

Based on similarities scores computed for each user in the pool 1002, the match making algorithm can select end users (e.g., end users 1004a-c) from the pool 1002 who have a similarity score meeting a certain similarity threshold (e.g., having a score above a certain number of points). In some cases, the match making algorithm can select end users who are within a certain percentile (e.g., in the top 50 percent, in the top 25 percent), or end users who have an above average similarity score, etc.

In some embodiments, only a subset of end users in pool 1002 are selected from the pool in step 1104 to proceed to step 1106. These embodiments may eliminate some end users who are not sufficiently similar to the end user 1000 early in the match making algorithm, and only consider end users who are sufficiently similar to the end user 1000 at the next step. In some embodiments, all end users in the pool 1002 are selected in step 1104 to proceed to step 1106. These embodiments may not eliminate end users who are not sufficiently similar to end user 1000, but the end user being selected for the second set in step 1106 are selected based on the similarity scores computed the end users in pool 1002 to account for end users in the second set who have communicated with end users in pool 1002 who are more or less similar to end user 1000.

In some embodiments, the pool 1002 of end users are selected from the general body of end users on the online social platform as candidate users who might be similar to end user 1000 using one or more (similarity/demographic) criteria. For instance, the pool 1002 of end users have the same gender as the end user to be matched, and/or seeks the same gender as the end user to be matched (aiming to find a pool of end users who have the same sexual preferences and/or of the same gender). In another instance, the pool 1002 of end users who each has an age which falls within an age range defined around the age of the end user to be matched (or within a certain buffer, aiming to identify a pool of end users within the end user to be match's age group or age group within buffer). In yet another instance, the pool 1002 of end users may be located within an area defined by an extended distance radius beyond the distance radius in the search criteria specified by the end user to be matched (aiming to generate a pool of nearby users).

At step 1110 of FIG. 11, one or more matching end users may be selected from the second set (i.e., one or more end users may be selected from potential matching end users) in different ways. In one embodiment, the one or more end users from the second set are selected at random. In another embodiment, all of the users from the second set are selected as the one or more matching end users. In various embodiments, the potential matching end users are subject to the non-profile specific and/or profile-specific eligibility requirements to be a matching end user disclosed herein.

In yet another embodiment, the one or more end users are selected based on a match score computed for each end user in the second set of end user(s). The match score may be used to determine whether a particular end user is likely to be a good match. The match score may be used to rank the end users in the second set of end users, or the end users selected to be the one or more matching end users. The matching end users may be displayed according to an order specified by the ranking. The match score may also be compared against a match score threshold (i.e., whether the match score is higher than a threshold score). In some cases, the match making algorithm checks whether the match score is within a particular percentile, above average, etc. Similar to the score values which comprises the triangulation variable (disclosed herein), the match score may also be combined with one or more search criteria variables (disclosed herein).

In one example, the match score may be tabulated based on the number of end users in the first set with whom a particular end user in the second set has participated in a form of electronic communication. If end user 1006*a* has participated in a first form of communication with 1004*a*, 1004*b*, the match score may be 2. If end user 1006*c* has communicated with end user 1004*a*, 1004*b*, and 1004*c*, the match score may be 3. The match score may be determined for a particular end user in the second set of end user(s) based on the similarity score(s) computed for the end user(s) in the first set of end users with which the particular end user in the second set of end users participated in the first form of electronic communication. For instance, the match score may comprise a sum of a sum or a product, or some other combination, of the similarity scores computed for the end user(s) in the first set of end users with which the particular end user in the second set of end users participated in the first form of electronic communication. Consider end user 1004*a* to have a similarity score of 5 with end user 1000, end user 1004*b* has a similarity score of 8 with end user 1000, and end user 1004*c* has a similarity score of 7.1 with end user 1000. The similarity score for end user 1006*d* who has participated in a first form of communication with end user 1004*b* and 1004*c* may have a similarity score of 8+7.1=15.1 or 8×7.1=56.8, depending on the combination chosen for the implementation of the match score.

Although the present disclosure has been described in detail with reference to particular embodiments, it should be understood that various other changes, substitutions, and alterations may be made hereto without departing from the spirit and scope of the present disclosure. For example, although the present disclosure has been described with reference to a dating protocol, any service that deals with (or that leverages) profiles, photos, resumes, user information more generally, etc. could readily benefit from the present disclosure.

Moreover, although the present disclosure has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

It should also be noted that any of the question portions of the platform can leverage any type of format. Thus, in any aspect of the online dating process described herein, such as establishing a personality profile, for example, any suitable question format can be employed. Example formats include a Yes/No format, a multiple choice question format, a short answer format, a true/false format, etc. Other formats can readily be used in order to achieve the desired responses and solicit the necessary data.

When a variable (or factor, or term) is described herein as a variable which contributes negatively or positively (or has a negative contribution or a positive contribution respectively) to a score or score value, it is possible that the contribution made by the variable is greater as the variable becomes greater (e.g., the contribution is proportional to the variable or grows with the variable). It is also possible that the contribution made by the variable corresponds to a fixed value which is not necessarily proportional to the variable.

It is noted that the positive contribution is related to whether a particular variable/factor/term in some way could improve the likelihood that a potential matching end user is a good match. Conversely, the negative contribution is related to whether a particular variable/factor/term could in some way worsen the likelihood that a potential matching end user is a good match.

It is further noted that the statistical models described herein illustrates a system where positive and/or higher positive scores or score values (e.g., including terms which make up the score value) indicate a higher likelihood that a potential matching end user is a good match for the end user to be matched. Low positive scores, or even negative scores (e.g., including terms which make up the score value) tend to indicate a lower likelihood that a potential matching end user is a good match. In this setup, variables that contribute positively tend to increase the overall score, and variable that contribute negatively tend to decrease the overall score. An equivalent statistical model may be provided where the relationship between a high score indicating a good match is reversed, i.e., where a low/negative score indicates a good match instead. The variables, terms, and coefficients (e.g., the positive/negative signs of values) would be provided differently, depending on the setup statistical model.

Note that in certain example implementations, the matching functions, match making algorithms, user interfaces, and electronic communication functions outlined herein, such as those carried out by web server 16 and/or provided as an application for an endpoint being operated by an end user (e.g., a mobile application for an iPhone™), may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). User input from end users are not limited to clicks or clicking, but also encompasses other forms of user input such as pressing on a display screen, gestures, voice commands, etc. In some of these instances, a memory, as shown in FIG. 1, can store data used for the operations described herein. This includes the memory being able to store software, logic, code, or processor instructions that are executed to carry out the activities described in this Specification.

A processor can execute any type of instructions associated with the data to achieve the operations detailed herein in this Specification. In one example, the processor, as shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein may maintain information in any suitable memory (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of more than one network element. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for selecting one or more matching end users for an end user seeking a match on an online social platform where end users participate in different forms of electronic communications with varying levels of engagement with other end users, the method comprising:
   receiving, by a server, responses from the end users to a plurality of questions provided by the online social platform, wherein a response comprises a user selection, via an endpoint, from a plurality of photographs of celebrities presented by a question;
   improving a likelihood of the server identifying a successful match for the end user seeking the match based on past communication actions of a pool of end users by:
      converting, by the server, the responses received from the pool of end users to a similarity score that quantifies how similar each end user in the pool of end users is to the end user seeking the match based on which of the plurality of photographs of celebrities is selected in the responses, wherein the similarity score is computed for each end user in the pool of end users based on the responses received from the end user being matched and the responses received from the end users in the pool of end users;
      selecting, by the server, a first set of end users from the pool of end users using the similarity score;
      determining, by the server, a second set of end users, wherein the end users in the second set of end users have participated in a first form of electronic communication with the end users in the first set of end users;
      selecting, by the server, one or more end users from the second set of end users as the one or more matching end users; and
      transmitting an indication of the one or more matching end users from the server to an endpoint associated with the end user seeking the match.

2. The method of claim 1, wherein:
   for each end user in the pool of end users, the similarity score is computed based on:
      a similarity variable per question based on whether the user selection made by the end user being matched and the user selection made by the end user from the pool of end users are the same; and
      a rarity variable per question based on the number of end users who made the same user selection divided by the number of end users in the pool of end users.

3. The method of claim 2, wherein the similarity variable contributes positively to the similarity score, and the rarity variable contributes negatively to the similarity score.

4. The method of claim 2, wherein:
computing the similarity score comprises dividing the similarity variable by the rarity variable for each question to obtain a quotient for each question; and
the similarity score comprises a sum of the quotients.

5. The method of claim 1, wherein:
selecting a first set of end users from the pool of end users comprises selecting end users from the pool of end users having a similarity score meeting a similarity threshold.

6. The method of claim 1, wherein:
the first form of electronic communication involves two-way electronic message or mail communication between two end users.

7. The method of claim 1, further comprising:
if the second set of end users is an empty set, determining a third set of end users, wherein the end users in the third set of end users have participated in a second form of electronic communication with the end users in the first set of end users;
wherein a level of engagement indicated by the second form of electronic communication is less than a level of engagement indicated by the first form of electronic communication; and
selecting one or more end users from the third set of end users as the one or more matching end users.

8. The method of claim 1, further comprising:
determining a match score for each end user in the second set of end users, wherein the match score is determined for a particular end user in the second set of end users based on the similarity scores computed for the end users in the first set of end users with which the particular end user in the second set of end users participated in the first form of electronic communication.

9. The method of claim 8, wherein the match score comprises a sum of the similarity scores computed for the end users in the first set of end users with which the particular end user in the second set of end users participated in the first form of electronic communication.

10. The method of claim 8, wherein the match score for an end user in the second set of end users is based further on:
a triangulation score based on the number of end users with whom both the end user seeking the match and the end user in the second set of end users have participated in the first form of electronic communication.

11. The method of claim 1, wherein selecting one or more end users from the second set of end users as the one or more matching end users comprises checking whether the one or more end users meet, within a buffer, a search criteria requirement provided by the end user seeking the match, wherein the buffer relaxes the search criteria requirement.

12. The method of claim 11, wherein the buffer is provided if the one or more end users or the end user seeking the match meets one or more conditions.

13. The method of claim 11, wherein the buffer is not provided if the one or more end users or the end user seeking the match meets one or more conditions.

14. One or more non-transitory tangible media that includes code for execution and when executed by a processor is operable to perform operations selecting one or more matching end users for an end user seeking a match on an online social platform where end users participate in different forms of electronic communications with varying levels of engagement with other end users, the operations comprising:

receiving, by a server, responses from the end users to a plurality of questions provided by the online social platform, wherein a response comprises a user selection, via an endpoint, from a plurality of photographs of celebrities presented by a question;
improving a likelihood of the server identifying a successful match for the end user seeking the match based on past communication actions of a pool of end users by:
converting, by the server, the responses received from the pool of end users to a similarity score that quantifies how similar each end user in the pool of end users is to the end user seeking the match based on which of the plurality of photographs of celebrities is selected in the responses, wherein the similarity score is computed for each end user in the pool of end users based on the responses received from the end user being matched and the responses received from the end users in the pool of end users;
selecting, by the server, a first set of end users from the pool of end users using the similarity score;
determining, by the server, a second set of end users, wherein the end users in the second set of end users have participated in a first form of electronic communication with the end users in the first set of end users;
selecting, by the server, one or more end users from the second set of end users as the one or more matching end users; and
transmitting an indication of the one or more matching end users from the server to an endpoint associated with the end user seeking the match.

15. The one or more non-transitory tangible media of claim 14, wherein the operations further comprises:
if the second set of end users is an empty set, determining a third set of end users, wherein the end users in the third set of end users have participated in a second form of electronic communication with the end users in the first set of end users;
wherein a level of engagement indicated by the second form of electronic communication is less than a level of engagement indicated by the first form of electronic communication; and
selecting one or more end users from the third set of end users as the one or more matching end users.

16. The one or more non-transitory tangible media of claim 14, wherein the similarity variable contributes positively to the similarity score, and the rarity variable contributes negatively to the similarity score.

17. The one or more non-transitory tangible media of claim 14, wherein:
computing the similarity score comprises dividing the similarity variable by the rarity variable for each question to obtain a quotient for each question; and
the similarity score comprises a sum of the quotients.

18. A server for selecting one or more matching end users an end user seeking the match on an online social platform where end users participate in different forms of electronic communications with varying levels of engagement with other end users, the server comprising:
a memory for storing a log of the different forms of electronic communications among the end users; and
a processor for:
receiving responses from end users to a plurality of questions provided by the online social platform, wherein a response comprises a user selection from a plurality of photographs of celebrities presented by a question;

improving a likelihood of the server identifying a successful match for the end user seeking the match based on past communication actions of a pool of end users by:

converting the responses received from the pool of end users to a similarity score that quantifies how similar each end user in the pool of end users is to the end user seeking the match, wherein the similarity score is computed for each end user in the pool of end users based on the responses received from the end user being matched and the responses received from the end users in the pool of end users;

selecting a first set of end users from the pool of end users using the similarity score;

determining a second set of end users, wherein the end users in the second set of end users have participated in a first form of electronic communication with the end users in the first set of end users;

selecting one or more end users from the second set of end users as the one or more matching end users; and transmitting an indication of the one or more matching end users from the server to an endpoint associated with the end user seeking the match.

19. The server of claim 18, wherein the processor is further for:

if the second set of end users is an empty set, determining a third set of end users, wherein the end users in the third set of end users have participated in a second form of electronic communication with the end users in the first set of end users;

wherein a level of engagement indicated by the second form of electronic communication is less than a level of engagement indicated by the first form of electronic communication; and selecting one or more end users from the third set of end users as the one or more matching end users.

20. The server of claim 19, wherein for each end user in the pool of end users, the processor computes the similarity score based on:

a similarity variable per question based on whether the user selection made by the end user being matched and the user selection made by the end user from the pool of end users are the same, and a rarity variable per question based on the number of end users who made the same user selection divided by the number of end users in the pool of end users; and wherein the similarity variable contributes positively to the similarity score, and the rarity variable contributes negatively to the similarity score.

* * * * *